(12) United States Patent
Kallsen et al.

(10) Patent No.: US 6,416,561 B1
(45) Date of Patent: Jul. 9, 2002

(54) OPEN FLOW FILTER WITH SAFETY ELEMENT

(75) Inventors: Kent J. Kallsen, Oregon; Tadeusz Jaroszczyk, Stoughton; Stephen L. Fallon; Z. Gerald Liu, both of Madison; Jerald J. Moy, Stoughton; Jeffrey S. Morgan, Stoughton; Michael J. Connor, Stoughton; Scott P. Heckel, Stoughton; Jon S. Wake, Verona, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/698,002

(22) Filed: Oct. 20, 2000

(51) Int. Cl.$^7$ .......................... B01D 29/56; B01D 46/02
(52) U.S. Cl. .......................... 55/482; 55/385.3; 55/498; 55/502; 55/510; 55/DIG. 28
(58) Field of Search ............... 55/385.3, 482, 55/486, 487, 488, 589, 495, 498, 500, 502, 510, DIG. 28, DIG. 30; 123/198 E; 210/493.1, 493.2, 493.5

(56) References Cited

U.S. PATENT DOCUMENTS

| | | | | |
|---|---|---|---|---|
| 5,110,561 A | * | 5/1992 | Hitachi et al. ............. 55/385.3 |
| 5,431,706 A | * | 7/1995 | Paas ........................... 55/385.3 |
| 5,487,767 A | * | 1/1996 | Brown ........................ 55/482 |
| 5,674,393 A | * | 10/1997 | Terhune et al. .............. 55/498 |
| 6,093,237 A | * | 7/2000 | Keller et al. ................. 55/486 |
| 6,099,606 A | * | 8/2000 | Miller et al. ................. 55/482 |
| 6,149,700 A | * | 11/2000 | Morgan et al. ............. 55/385.3 |
| 6,152,996 A | * | 11/2000 | Linnersted et al. .......... 55/486 |
| 6,179,890 B1 | * | 1/2001 | Ramos et al. ................ 55/482 |
| 6,261,334 B1 | * | 7/2001 | Morgan et al. .............. 55/498 |
| 6,306,193 B1 | * | 10/2001 | Morgan et al. .............. 55/498 |

\* cited by examiner

*Primary Examiner*—Duane Smith
*Assistant Examiner*—Jason M. Greene
(74) *Attorney, Agent, or Firm*—Andrus, Sceales, Starke & Sawall, LLP

(57) ABSTRACT

An open flow fluid filter has a pleated main filter element having a plurality of pleats in a closed loop having an outer perimeter defined by a plurality of outer pleat tips, and an inner perimeter defined by a plurality of inner pleat tips. The loop has a hollow interior extending along an axis. Fluid to be filtered flows through the main filter element from an upstream dirty side to a downstream clean side, and flows axially in the hollow interior. The main filter element has an axial flow passage extending along the axis and circumscribing the hollow interior and has a flow perimeter greater than the inner perimeter. A safety filter element downstream of the main filter element filters both the axial flow in the hollow interior and additional flow between the flow perimeter and the inner perimeter. A filter with additional flow is also provided.

41 Claims, 12 Drawing Sheets

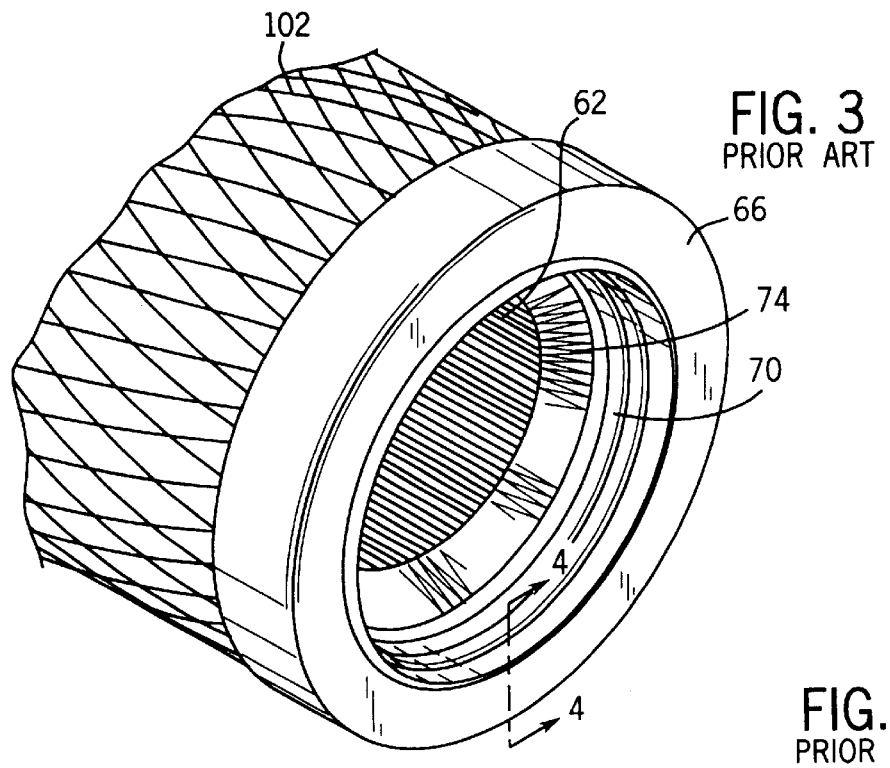
FIG. 3
PRIOR ART
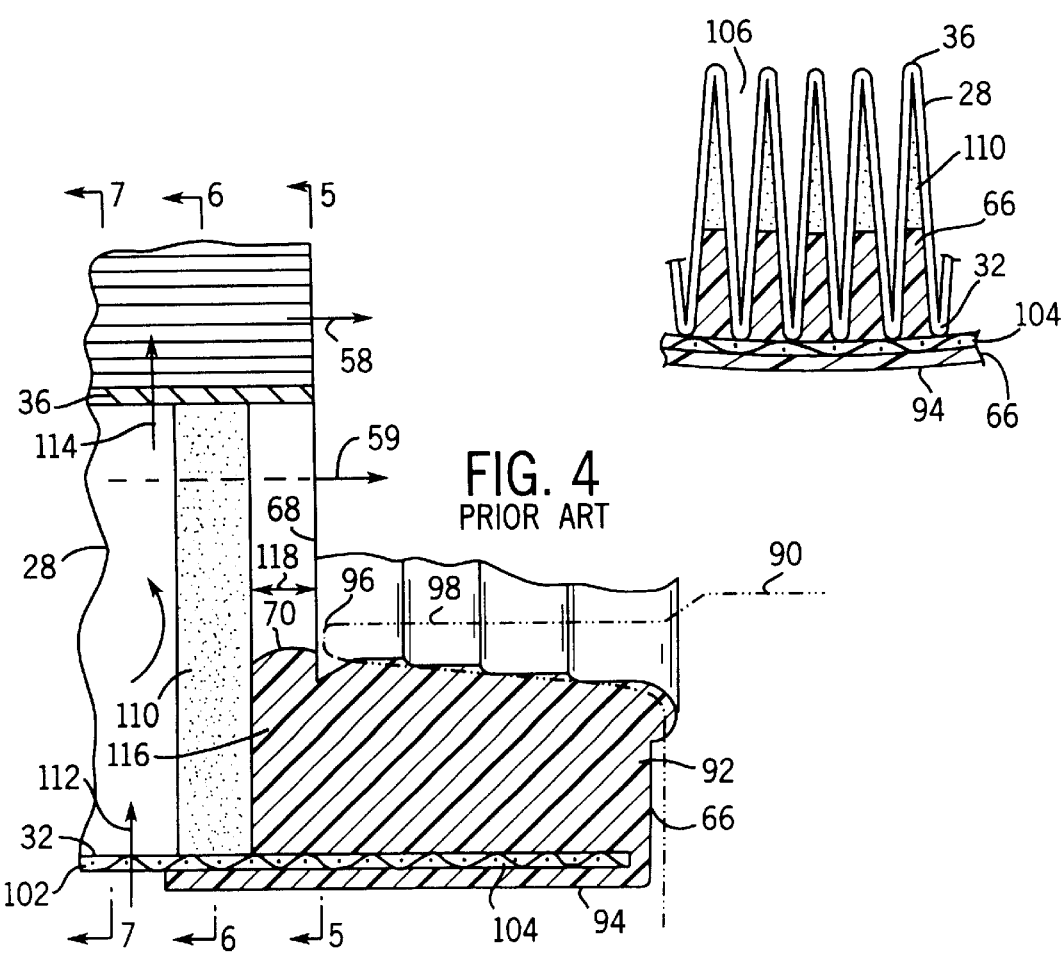
FIG. 5
PRIOR ART
FIG. 4
PRIOR ART

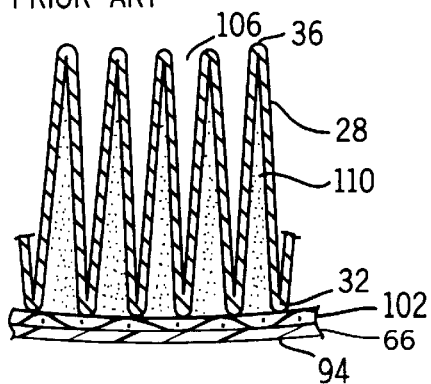
FIG. 6 PRIOR ART
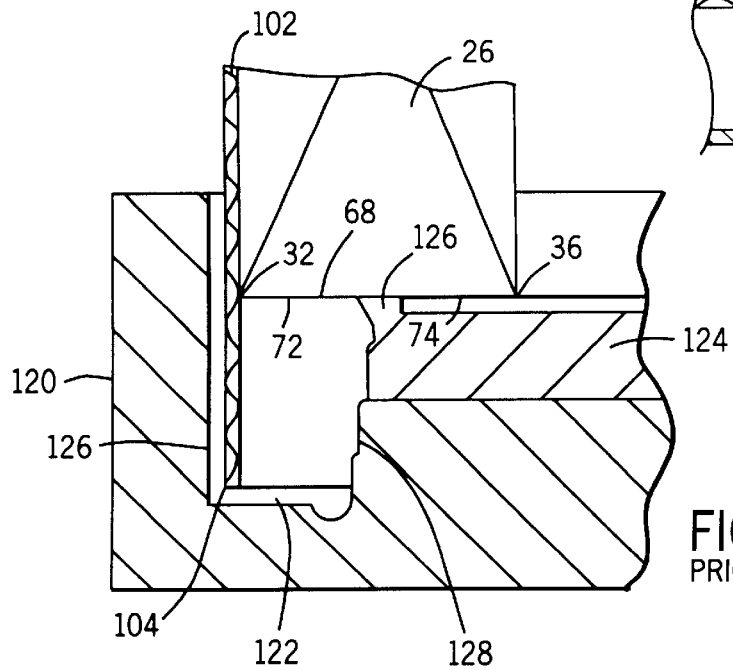
FIG. 7 PRIOR ART
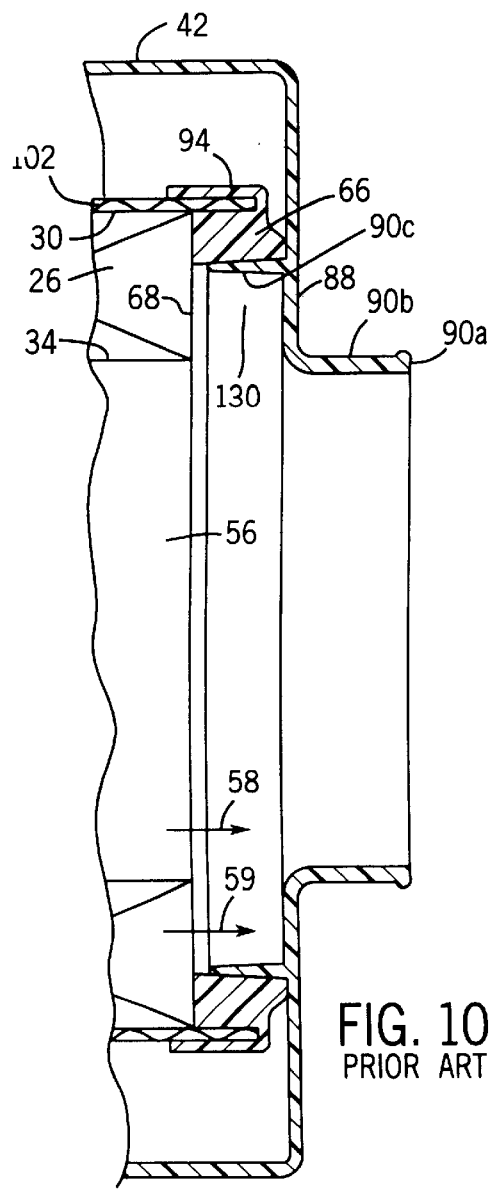
FIG. 10 PRIOR ART
FIG. 11 PRIOR ART

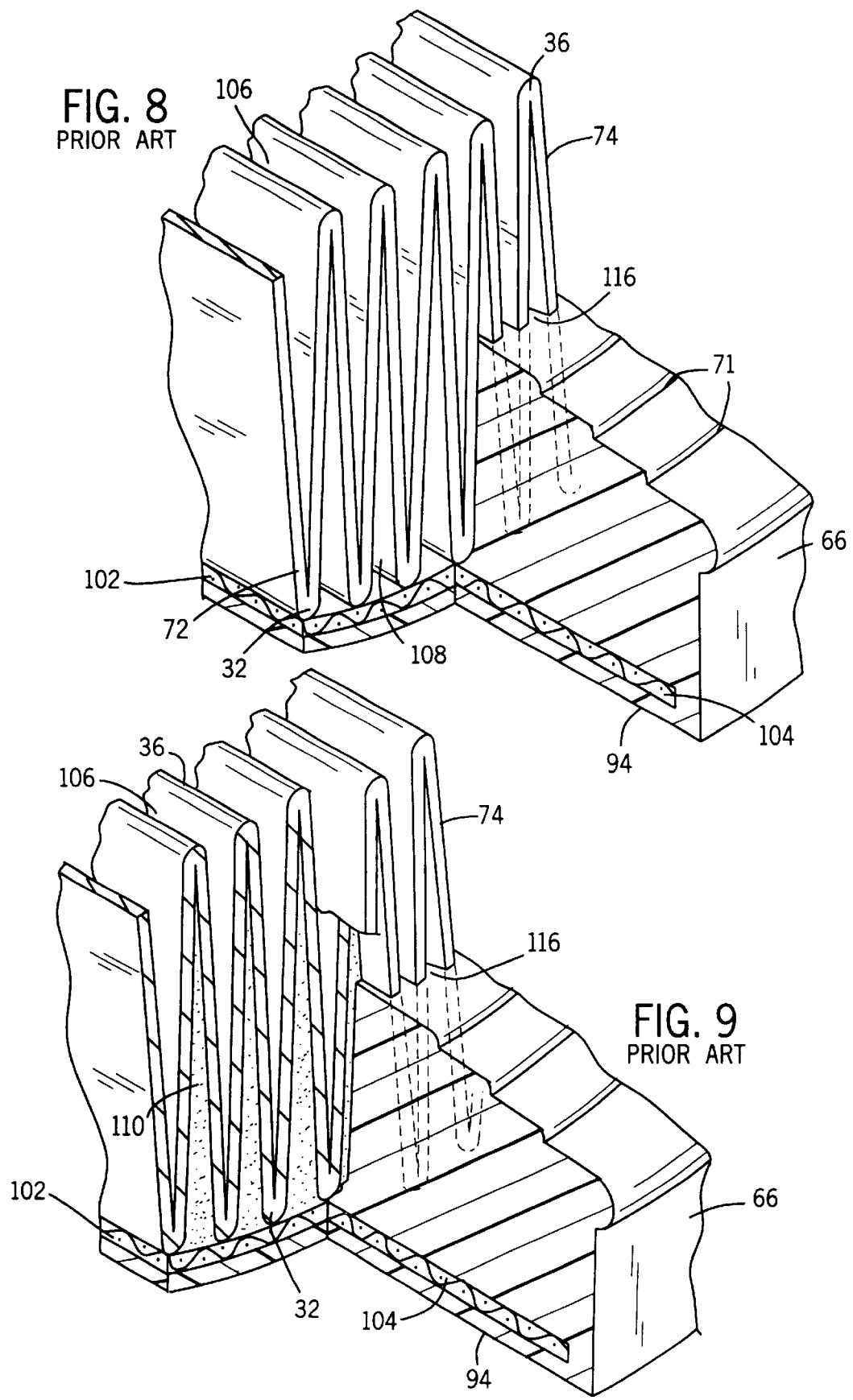

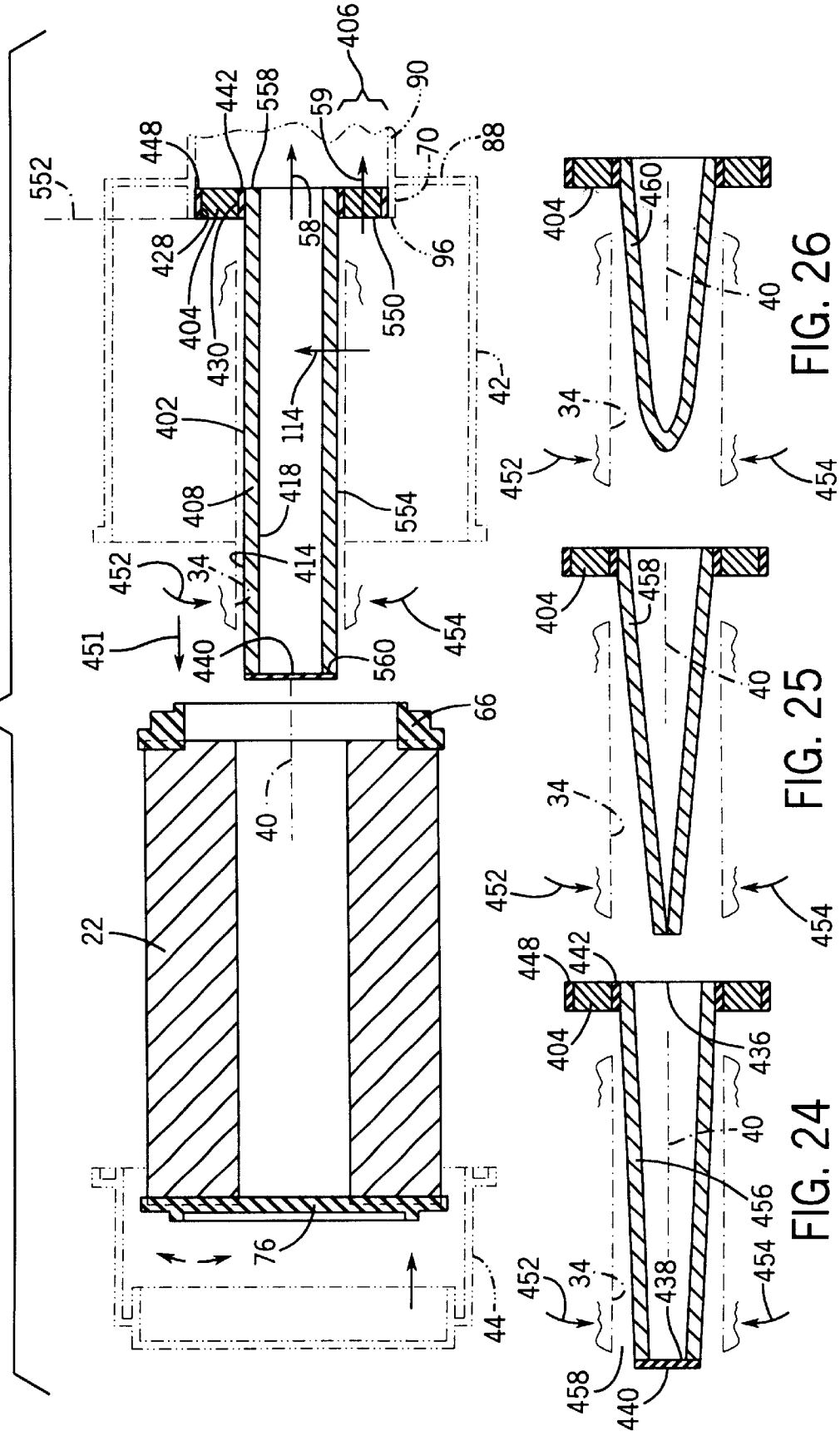

OPEN FLOW FILTER WITH SAFETY ELEMENT

FIELD OF THE INVENTION

The invention relates to fluid filters, and more particularly to constructions maximizing flow capacity and minimizing restriction.

BACKGROUND OF THE INVENTION

There is continuing demand for increased flow capacity in the same or even smaller size filters. This is particularly true in air cleaner designs for internal combustion engines, where engine compartment space is limited. A filter construction enabling higher capacity in the same or less space provides competitive advantage and a space efficient filter system.

A common air cleaner used in truck engines has a filter element provided by pleated filter media having a plurality of pleats in a closed loop configuration, typically annular, having an outer perimeter defined by a plurality of outer pleat tips, an inner perimeter defined by a plurality of inner pleat tips, and a hollow interior extending along an axis. The air typically flows laterally or radially inwardly through the filter media into the hollow interior and then axially outwardly through an outlet flow tube to the combustion air intake of the engine. The outlet tube has a diameter slightly smaller than the diameter of the hollow interior between the inner pleat tips. A first end cap covers the axial ends of the pleats at one axial end of the filter element and forms a radial seal with the outlet tube extending therethrough partially into the hollow interior. Additionally or alternatively, the end cap forms an axial seal with the housing containing the filter element. The end cap is a resilient compressible material, to aid in forming the noted seals. The radial seal is formed by radially compressing the end cap material between the outlet tube and the inner pleat tips or an inner liner extending therealong. The axial seal is formed by axially compressing the end cap material between the axial ends of the pleats and the axial end of the housing containing the filter element. A second end cap covers the axial ends of the pleats at the other axial end of the filter element and may span the hollow interior to close same, or such hollow interior may be closed by a portion of the housing extending thereinto. The flow capacity of the filter is affected by various factors, including restrictions, such as the size of the outlet opening through the earlier noted outlet tube at the axial end of the filter.

The invention of commonly owned U.S. application Ser. No. 09/240,714, filed Jan. 29, 1999, now U.S. Pat. No. 6,149,700, increases flow capacity by enabling enlargement of the outlet flow passage, to lower the noted restriction to flow. The increased outlet size of the filter element and lowered restriction is accomplished while still maintaining or even increasing the amount of filter media and while also staying within the same package or housing size. As noted above, in the prior art, the largest diameter outlet from the filter element is limited to approximately the size of the diameter of the hollow interior defined by the inner pleat tips. In the preferred embodiment of the invention of the '714 application, the end cap encloses only the outer edges of the axial ends of the pleats, and has an inner diameter larger than the diameter of the hollow interior defined by the inner pleat tips. The enlarged inner diameter of the end cap forms a radial seal with an enlarged outlet tube having a diameter greater than the diameter of the hollow interior defined by the inner pleat tips. A radial seal is formed between the enlarged diameter outlet tube and the enlarged inner diameter end cap at a location along the axial ends of the pleats between the inner pleat tips and the outer pleat tips. An outer liner circumscribes the filter element along the outer pleat tips and extends beyond the axial end thereof into the end cap and provides support for the noted radial seal, i.e. the end cap material is radially compressed between the outlet tube and the outer liner. The outlet flow passage from the filter element is now the inside diameter of the end cap rather than the diameter of the hollow interior defined by the inner pleat tips. Fluid passing through the filter media can now also travel axially between the pleats as well as axially through the hollow interior defined by the inner pleat tips. As a result of such construction, fluid flow restriction is reduced, and the radial depth of the pleat is no longer limited to a specific outlet tube diameter. Instead, the radial depth of the pleat can theoretically extend all the way to the axial center line of the filter, allowing maximization of filter media area within a given package or housing size. The invention of the '714 application may also be used for opposite direction flow filters, in which case enlargement of the inlet flow passage is enabled, to reduce inlet flow restriction.

The invention of commonly owned U.S. application Ser. No. 09/527,792, filed Mar. 17, 2000, now U.S. Pat. No. 6,261,334, further increases flow capacity by enabling further enlargement of the outlet flow passage, to further lower the noted restriction to flow. The further increased outlet size of the filter element and the further lowered restriction is accomplished while still maintaining or even increasing the amount of filter media and while also staying within the same package or housing size. In the invention of the '792 application, the largest diameter outlet from the filter element is not limited to the size of the diameter of the hollow interior defined by the inner pleat tips, nor limited to the inner diameter of the end cap even if the latter is enlarged in accordance with the invention of the '714 application. The invention of the '792 application enables the filter outlet to have a diameter substantially as large as the outer diameter of the filter element at the outer pleat tips. The invention of the '792 application may be used for opposite direction flow filters, in which case maximized enlargement of the inlet flow passage is enabled, to minimize inlet flow restriction.

The invention of commonly owned copending U.S. application Ser. No. 09/616,188, filed Jul. 14, 2000, provides a full flow fluid filter wherein the fluid flows substantially directly axially through the filter element, lowering restriction to flow by minimizing bends or changes of direction in the flow pattern.

The above described filter constructions increase flow capacity and minimize restriction of primary or main filter elements. These open flow constructions have not lent themselves to the incorporation of a classical safety filter without decrease of filtration performance.

The role of a safety filter is to protect the engine during replacement of the main or primary filter element, or in case of failure or leakage of the main filter element. Separate sealing of the safety and main filter elements is required to allow for secure replacement of the main filter element. When failure occurs, the safety element is designed to plug quickly and shut down the engine. Safety filter elements typically have efficiencies less than that of the main filter element. The dust holding capacity of the safety filter element is low, usually less than 5% of the main filter element capacity. Adding a safety filter element to an air cleaner system generally increases the overall air cleaner restriction by 10–30%.

Adding a conventionally constructed safety filter element to the above described open flow filter constructions eliminates the advantages of the latter and/or leaves a bypass path which defeats the safety system.

SUMMARY OF THE INVENTION

The present invention provides a high capacity filter with an open flow main filter element and a safety filter element, and overcomes the above noted problems in a simple and effective manner.

The invention also provides a high capacity filter with a direct full flow main filter element and a safety filter element overcoming the above noted problems.

The invention further provides a filter construction with reduced overall restriction and increased filtering surface area.

BRIEF DESCRIPTION OF THE DRAWINGS

Background

FIG. 3 is an isometric view of aportion of the filter element of FIG. 2.

FIG. 4 is a sectional view taken along line 4—4 of FIG. 3.

FIG. 5 is a sectional view taken along line 5—5 of FIG. 4.

FIG. 6 is a sectional view taken along line 6—6 of FIG. 4.

FIG. 7 is a sectional view taken along line 7—7 of FIG. 4.

FIG. 8 is an enlarged view of a portion of the structure of FIG. 3, partially cutaway.

FIG. 9 is a view like FIG. 8, with a further portion cut away.

FIG. 10 is a view like a portion of FIG. 2, and shows an alternate embodiment.

FIG. 11 shows a mold for molding or potting an end cap onto pleated filter media of the filter element.

Present Invention

Figure 17:
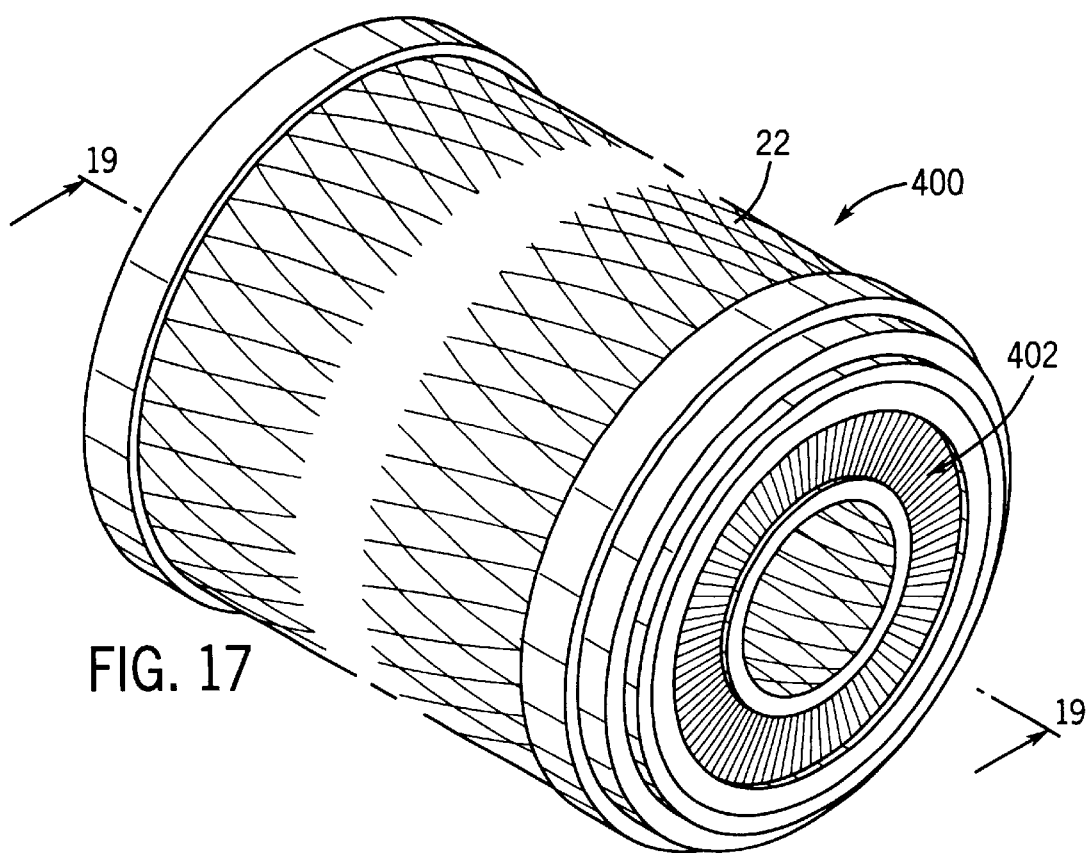

FIG. 17 is an isometric view similar to FIG. 3 and showing a main filter element and safety filter element in accordance with the present invention.

Figure 18:
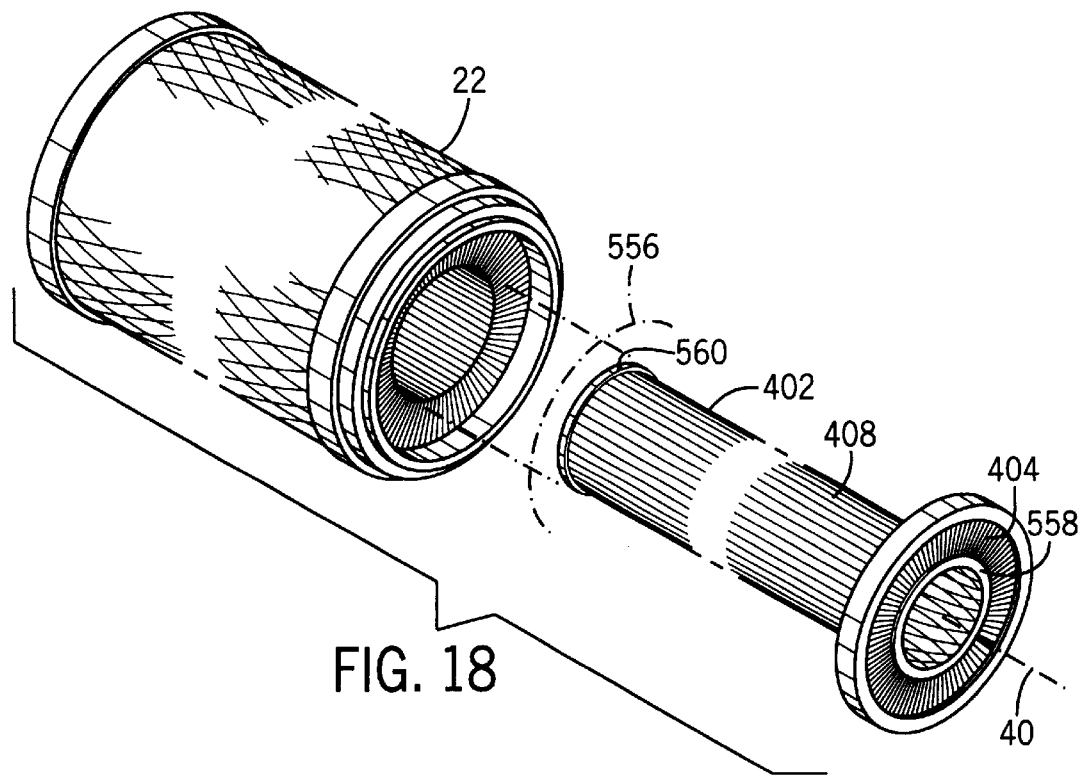

FIG. 18 is an exploded isometric view of the main and safety filter elements of FIG. 17.

Figure 19:
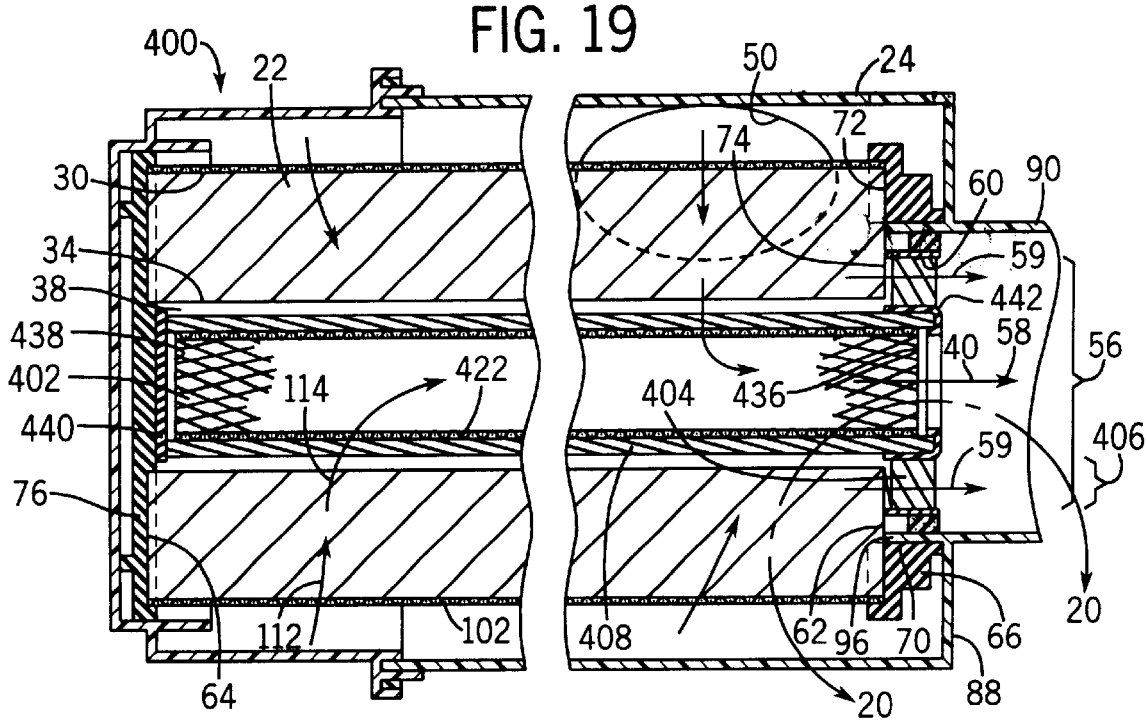

FIG. 19 is a cross sectional view taken along line 19—19 of FIG. 17 and also shows the filter housing.

Figure 20:
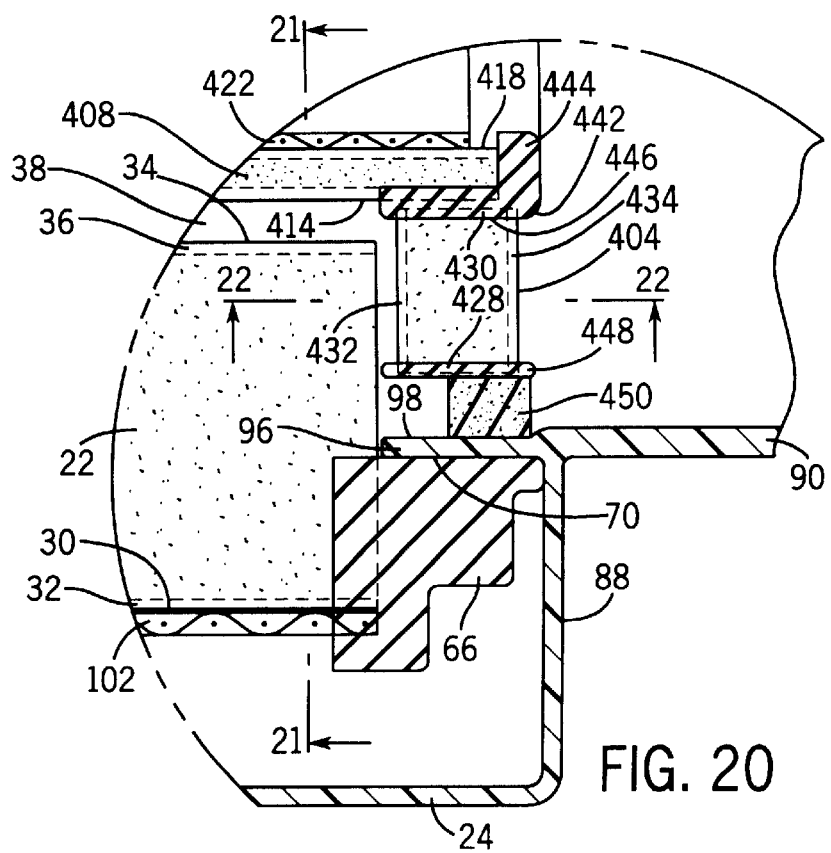

FIG. 20 is an enlarged view of a portion of FIG. 19.

Figure 21:
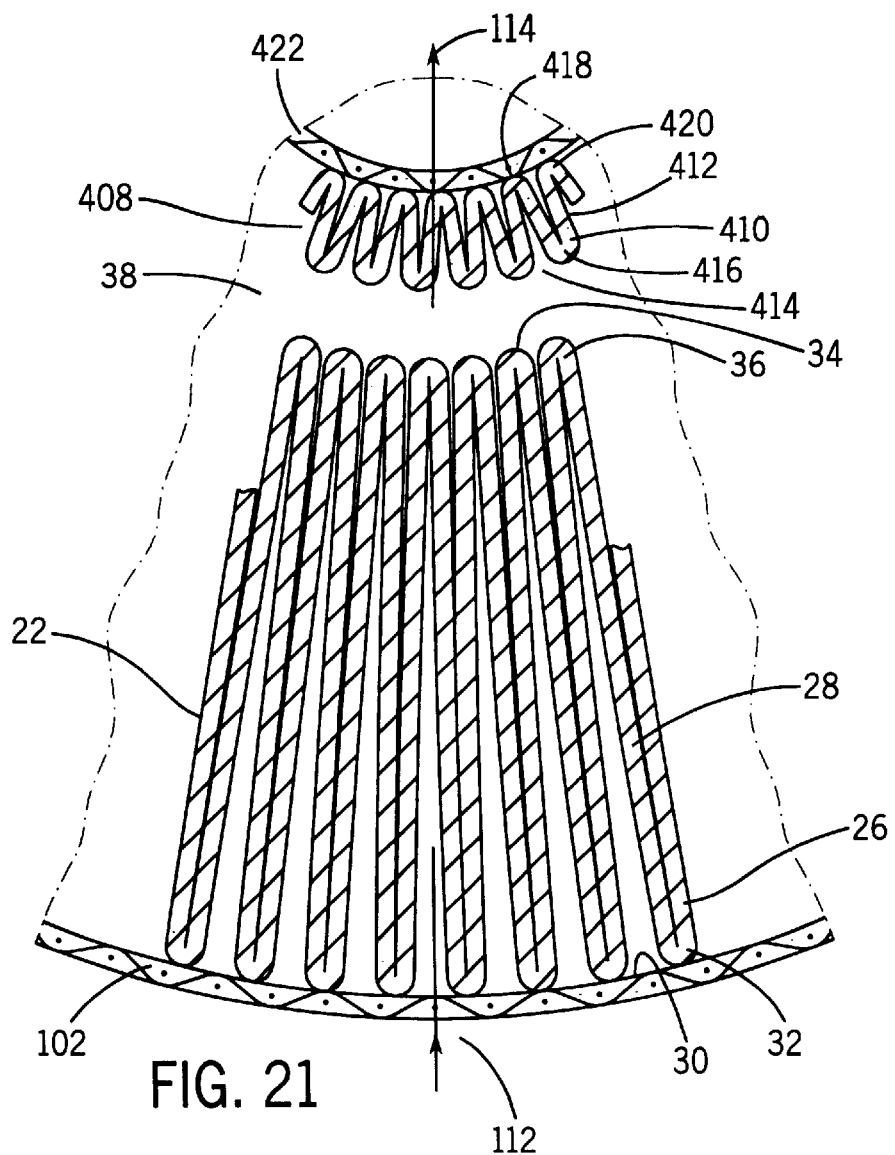

FIG. 21 is a sectional view taken along line 21—21 of FIG. 20.

Figure 22:
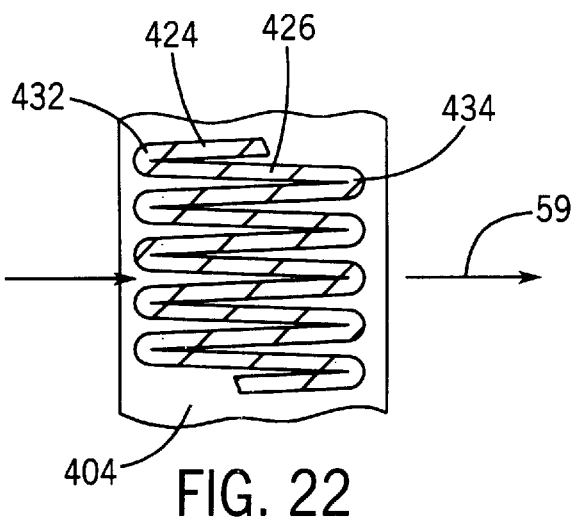

FIG. 22 is a sectional view taken along line 22—22 of FIG. 20.

FIG. 23 is a schematic exploded view of the construction of FIG. 19, illustrating removal of the main filter element.

FIG. 24 is a view like a portion of FIG. 23 and illustrates an alternate embodiment.

FIG. 25 is like FIG. 24 and illustrates an alternate embodiment.

FIG. 26 is like FIG. 24 and illustrates an alternate embodiment.

Figure 15:
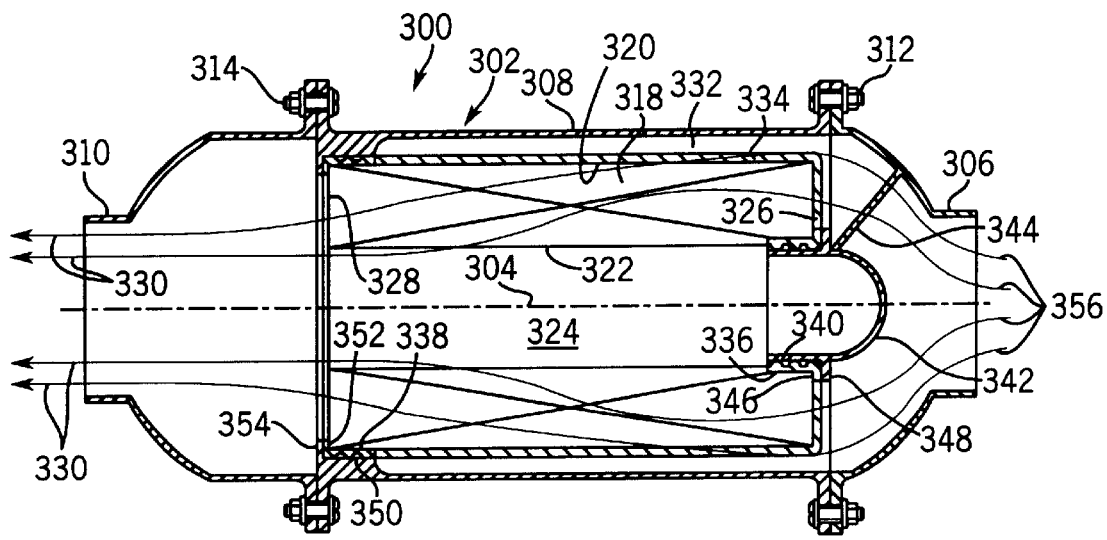
FIG. 15 is a sectional view similar to FIGS. 2 and 12 but showing a filter in accordance with the invention of above noted U.S. Ser. No. 09/616,188, filed Jul. 14, 2000.
Figure 27:
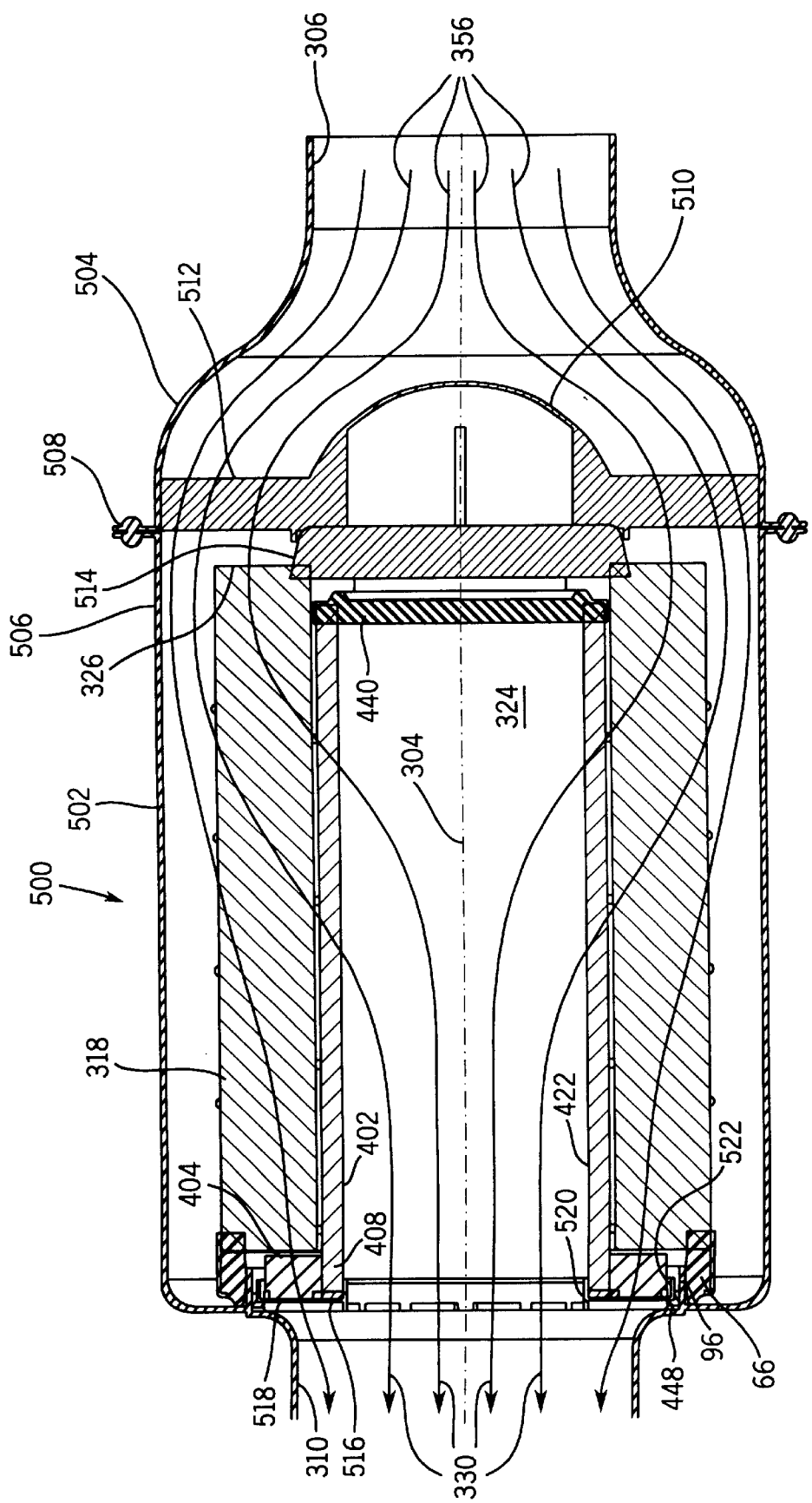

FIG. 27 is like FIG. 15 and shows a filter in accordance with the present invention.

DETAILED DESCRIPTION

Background

Figure 1:
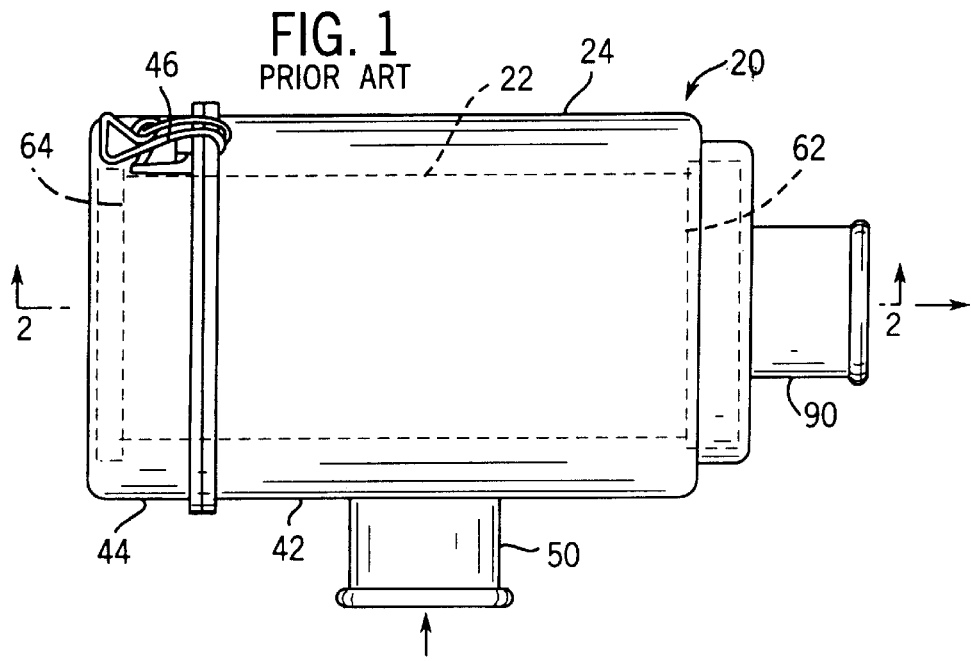
FIG. 1 is taken from the above noted U.S. application Ser. No. 09/240,714, filed Jan. 29, 1999, now U.S. Pat. No. 6,149,700, and is a side elevation view of a filter.
Figure 2:
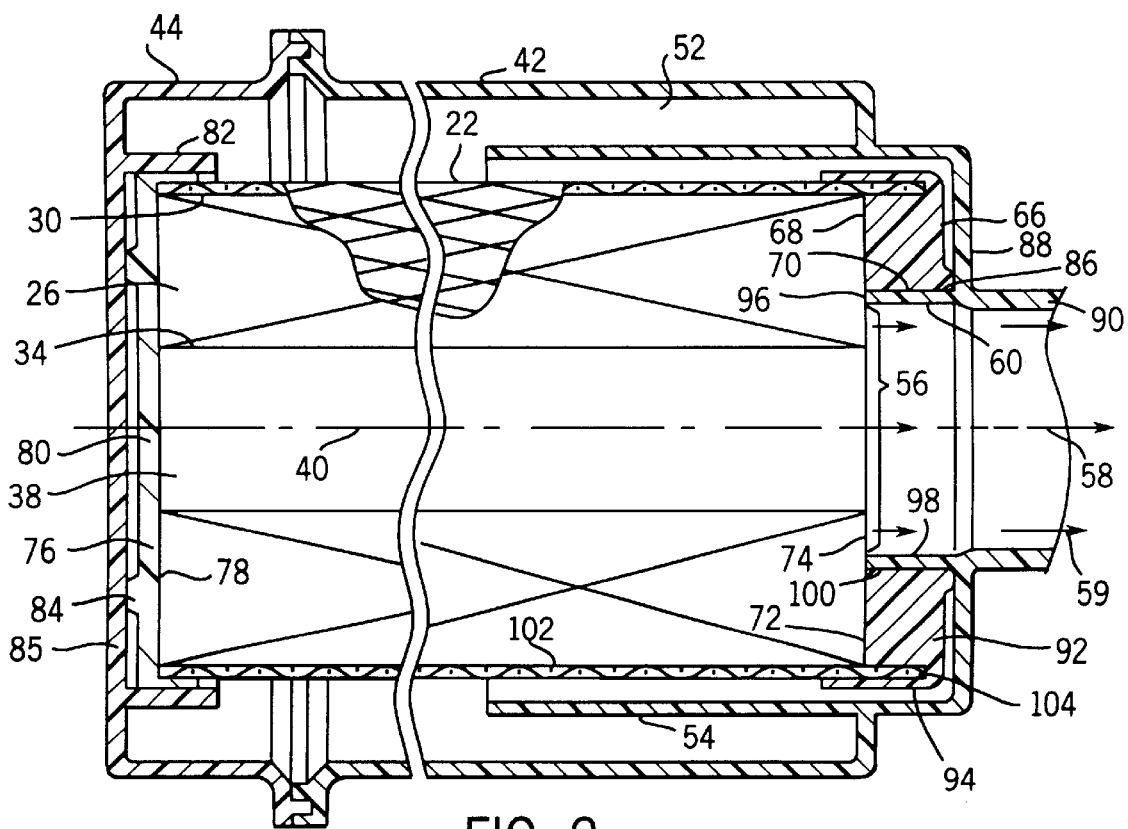
FIG. 2 is a sectional view taken along line 2—2 of FIG. 1.

FIGS. 1 and 2 show a filter 20 including a filter element 22 contained within a housing 24. Filter element 22 is provided by pleated filter media 26, FIG. 2, having a plurality of pleats 28, FIGS. 5–9, in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along an axis 40. Housing 24 is typically cylindrical and is provided by housing sections 42 and 44 mounted to each other in conventional manner such as by overcenter spring clip type clamps such as 46, or in other suitable manner. The housing has an inlet 50 admitting inlet fluid, such as air or liquid, radially and/or tangentially into annular space 52 within the housing around filter element 22. The housing may include an interior dam or deflection surface 54 for blocking direct impact against filter element 22 and/or for directing flow, for example in a spiral or toroidal pattern. The fluid flows laterally or radially inwardly through filter media 26 into hollow interior 38, and then the clean fluid flows axially rightwardly in FIG. 2 in hollow interior 38 along flow passage 56 as shown at arrows 58, 59.

Flow passage 56 extending along axis 40 circumscribes hollow interior 38 and has a flow perimeter 60 greater than inner perimeter 34 defined by inner pleat tips 36, to be described. Flow perimeter 60 is less than outer perimeter 30 defined by outer pleat tips 32. Inner perimeter 34 defines and bounds a first cross-sectional area. Flow perimeter 60 defines and bounds a second cross-sectional area. The second cross-sectional area is greater than the first cross-sectional area. Outer perimeter 30 defines and bounds a third cross-sectional area. The second cross-sectional area is less than the third cross-sectional area.

Filter element 22 has first and second axial ends 62 and 64. Axial end 62 is open, FIG. 3, and provides axial flow passage 56 therethrough. An end cap 66 of soft resilient compressible material, such as foamed potted urethane, axially abuts the axial ends 68 of the pleats. End cap 66 has an inner perimeter 70, FIGS. 3 and 4, greater than inner perimeter 34 defined by inner pleat tips 36. End cap 66 partially covers the axial ends 68 of the pleats such that the laterally outward portions 72 of the axial ends of the pleats are covered by end cap 66 but not the laterally inward portions 74 of the axial ends of the pleats, such that the laterally inward portions 74 of the axial ends of the pleats are uncovered and exposed at axial end 62 of filter element 22, FIGS. 8 and 9. Second axial end 64 of filter element 22 is closed. A second end cap 76, FIG. 2, of soft compressible resilient material, such as foamed potted urethane, is provided at second end 64 of the filter element and completely covers the axial ends 78 of the pleats including the outer pleat tips and the inner pleat tips at axial end 64. End cap 76 also includes a central section 80 spanning and completely covering hollow interior 38 of filter element 22 at axial end 64 of the filter element. Housing section 44 includes an annular interior sidewall 82 extending partially axially into the housing to locate and retain filter element 22 at axial end 64. In other embodiments, central section 80 of end cap 76 is omitted, and a portion of housing section 44 extends into hollow interior 38 of filter element 22 to close axial end 64 of the filter element and to position axial end 64 of the filter element within the housing. End cap 76 includes an annular ridge 84 engaging axial endwall 85 of housing section 44 and slightly axially compressed thereagainst to further aid in retention of filter element 22 within the housing and to accommodate axial tolerances. End cap 66 also includes an annular ridge 86 engaging axial endwall 88 of housing section 42 and slightly axially compressed thereagainst to aid in retaining filter element 22 within the housing and to accommodate axial tolerances and also to provide an axial seal to prevent bypass of dirty air from annular chamber 52 around axial end 62 of the filter element. Axial endwall 88 of housing section 42 has an outlet flow tube 90 extending therethrough. In addition to or alternatively to the axial seal at 86, end cap 66 provides a radial seal against outlet flow tube 90, to be described.

End cap 66 has a sidewall 92, FIGS. 2 and 4, extending axially away axial ends 68 of pleats 28 at axial end 62 of filter element 22. The sidewall has an inner perimeter 70, as above noted, and an outer perimeter 94. As noted above, inner perimeter 70 of sidewall 92 is greater than inner perimeter 34 of filter element 22 defined by inner pleat tips 36. Inner perimeter 70 of sidewall 92 of end cap 66 is less than outer perimeter 30 of filter element 22 defined by outer pleat tips 32. Outer perimeter 94 of sidewall 92 of end cap 66 is greater than outer perimeter 30 of filter element 22 defined by outer pleat tips 32. Flow tube 90 has an inner section 96 axially facing the axial ends 68 of pleats 28. Inner section 96 of flow tube 90 has an inner perimeter 98 and an outer perimeter 100. Outer perimeter 100 is greater than inner perimeter 70 of sidewall 92 of end cap 66, such that as filter element 22 at end cap 66 is axially slid rightwardly over inner section 96 of flow tube 90, end cap 66 is radially compressed to expand inner perimeter 70 along outer sidewall 100 of flow tube inner section 96 to effect the noted radial seal. Inner perimeter 70 of end cap 66 is preferably stepped, as shown at steps 71, FIG. 8, to have slightly progressively decreasing diameters from right to left as viewed in FIGS. 8 and 2, to receive and guide inner section 96 of flow tube 90 therealong and increase radial sealing pressure. End cap 66 circumscribes inner section 96 of flow tube 90 and bears radially thereagainst in sealing relation to form the noted radial seal thereat. Endwall 88 of housing section 42 axially faces axial ends 68 of pleats 28, and end cap 66 also bears axially against endwall 88 in sealing relation to form the noted axial seal thereat.

An outer liner 102, FIGS. 2 and 4, provided by an expanded wire mesh or screen or perforated metal, circumscribes filter element 22 along outer pleat tips 32 and has an axial end section 104 extending axially beyond the axial ends 68 of pleats 28. As above described, flow tube 90 communicates with hollow interior 38 of the filter element along flow passage 56 and extends axially from the axial end of the filter element. End cap 66 at the axial end of the filter element bears radially between and is radially compressed between and against section 104 of outer liner 102 and inner section 96 of flow tube 90. Outer liner 102 extends axially at 104 into end cap 66 and is potted therein during the molding process, to be described. As noted above, sidewall 92 of end cap 66 extends axially away from the axial ends 68 of pleats 28 at the axial end of the filter element. Outer perimeter 94 of the end cap sidewall circumscribes outer liner section 104.

Pleats 28 have pairs of walls defining axially extending interior channels 106, FIG. 7, and axially extending exterior channels 108. The walls of the pleats defining the exterior channels 108 are sealed to each other near axial end 62 of the filter element by heat seal bonding along glue strips such as 110, as known in the art, for example as disclosed in U.S. Pat. No. 5,106,397, incorporated herein by reference. This prevents bypass of dirty air around the axial ends of the pleats at inner exposed portions 74, FIGS. 8 and 9. Fluid such as air flowing radially inwardly through the filter media as shown at 112, FIG. 4, must flow through the sidewalls of pleats 28 before such fluid can flow axially as shown at arrows 58, 59. Some of such air can flow axially rightwardly in FIG. 4 as shown at arrow 59 axially along interior channels 106, and the balance of the air continues radially inwardly as shown at arrow 114 and then flows axially as shown at arrow 58. The axial ends of exterior channels 108 at the axial end of the filter element are blocked by the noted seal bonding along adhesive strips 110. Fluid flowing through the filter element is forced to pass from exterior channels 108 to interior channels 106. FIGS. 6 and 9 show the seal bonded adhesive 110 extending in exterior channels 108 all the way from inner pleat tips 36 to outer pleat tips 32 as idealized. If the seal bond does extend all the way from inner pleat tip 36 to outer pleat tip 32, then the shape of the interior channel 106 at outer pleat tip 32 will generally be more rounded and the walls of pleats 28 forming exterior channels 108 at outer pleat tips 32 will usually be closer together. In an alternative, the adhesive seal bond in exterior channels 108 may extend from inner pleat tips 36 only partially towards outer pleat tips 32, and the outer portions of exterior channels 108 are blocked at the axial end of the filter element by end cap 66. During the molding potting process, to be described, the liquid castable material into which the pleated filter media is dipped will foam up a short distance axially into the channels between the pleats, as shown at inner section 116, FIGS. 4, 8, 9, of the end cap which has migrated a distance 118, FIG. 4, between the pleats. The spacing of glue strips 110 on the pleats from the axial ends 68 of the pleats may be adjusted as desired in standard glue seal strip applicator machines. Preferably, glue seal strips 110 are spaced from axial ends 68 of the pleats by a small distance 118 to enable a slight deformation of the axial ends 68 of the pleats by a dam in the mold during the molding potting process, to keep the liquid castable material of the end cap from flowing radially inwardly onto inner portions 74 of the pleat ends which are desired to be exposed, which molding process and dam are to be described. Alternatively, seal glue strips 110 may be applied at axial ends 68 of the pleats, without gap 118 therebetween.

FIG. 11 shows a mold 120 for molding or potting end cap 66 onto pleated filter media 26 of the filter element. The mold has a trough 122 extending along an annular first perimeter and holding liquid castable material, such as urethane, therein into which axial ends 68 of pleats 28 are dipped. The mold has an insert 124 with an upstanding dam 126 extending along a second annular perimeter circumscribed by the noted annular perimeter of trough 122. Dam 126 engages axial ends 68 of the pleats between outer pleat tips 32 and inner pleat tips 36 and impedes flow of liquid castable material laterally radially inwardly towards inner pleat tips 36. Trough 122 partially spans axial ends 68 of the pleats such that the laterally outward portions 72 of the axial ends of the pleats are covered by the liquid castable material but not the laterally inward portions 74 of the pleats, such that laterally outward portions 72 of the axial ends of the pleats are covered by end cap 66, and laterally inward portions 74 of the axial ends of the pleats are uncovered by end cap 66 and are left exposed. It is preferred that the pleated filter media be dipped into the liquid castable material in the mold by lowering the pleated filter media downwardly until axial ends 68 of the pleats are engaged by dam 126, and then pushing the pleated filter media further slightly downwardly against the dam such that the dam slightly deforms axial ends 68 of the pleats at such engagement point which in turn pushes the pleat sidewalls forming the noted channels slightly laterally to further block the channels and further impede flow of liquid castable material laterally inwardly towards inner pleat tips 36. Trough 122 is bounded by an outer perimeter 126 and an inner perimeter 128. Outer perimeter 126 of trough 122 is greater than outer perimeter 30 of the filter element defined by outer pleat tips 32. Inner perimeter 128 of trough 122 is less than outer perimeter 30 of the filter element. Inner perimeter 128 of trough 122 is greater than inner perimeter 34 of the filter element defined by inner pleat tips 36. The noted second perimeter of the mold at annular dam 126 is less than or equal to inner perimeter 128 of trough 122.

As noted, the method for molding end cap 66 onto pleated filter media 26 involves dipping axial ends 68 of the pleats into liquid castable material in trough 122 of mold 120, and engaging axial ends 68 of the pleats against dam 126 at a location between outer pleat tips 32 and inner pleat tips 36 such that dam 126 impedes flow of the liquid castable material laterally inwardly towards inner pleat tips 36. Trough 122 is provided and aligned such that it partially spans axial ends 68 of the pleats such that the laterally outward portions 72 of the axial ends of the pleats are covered by the liquid castable material during dipping, but not the laterally inward portions 74 of the axial ends of the pleats. Further in accordance with the described method, laterally inward flow of the liquid castable material is impeded along the axial ends of the pleats toward inner pleat tips 36 by providing and aligning dam 126 to engage axial ends 68 of the pleats between outer pleat tips 32 and inner pleat tips 36, such that laterally outward portions 72 of the axial ends of the pleats are covered by end cap 66, and laterally inward portion 74 of the axial ends of the pleats are uncovered by end cap 66 and are left exposed. Trough 122 and filter element 22 are aligned during the noted dipping such that outer perimeter 126 of trough 122 circumscribes outer perimeter 30 of the filter element defined by outer pleat tips 32, and inner perimeter 128 of trough 122 circumscribes inner perimeter 26 of the filter element defined by inner pleats 36.

FIG. 10 shows an alternate embodiment wherein outlet flow tube 90a has an outer section 90b of reduced diameter to accommodate engine compartment size and location requirements, yet maintaining an increased diameter inner section 90c maintaining the increased diameter and perimeter flow passage 56 including axial fluid flow at 58 and the extra axial fluid flow at 59, FIGS. 4 and 10. The spacing of axial endwall 88 of housing section 42 from axial ends 68 of the filter media pleats provides a plenum 130 accommodating the extra flow and reducing restriction.

The described filter construction was developed for air filters, though may be used for other fluids such as liquid. In the disclosed embodiment, fluid to be filtered flows laterally inwardly through the filter media from the outer perimeter to the inner perimeter and then flows axially in the hollow interior, such that flow passage 56 is an outlet flow passage. Alternatively, fluid to be filtered may flow axially in hollow interior 38 and then flows laterally outwardly through the filter media from the inner perimeter to the outer perimeter, in which case flow passage 56 is an inlet flow passage. In other alternatives, metal end caps are used instead of urethane end caps, or various combinations of materials are used for the end caps. In further embodiments, an inner liner may be added along inner pleat tips 36. In further alternatives, outer section 90b, FIG. 10, of the flow tube has a larger inner diameter than inner section 90c.

Figure 12:
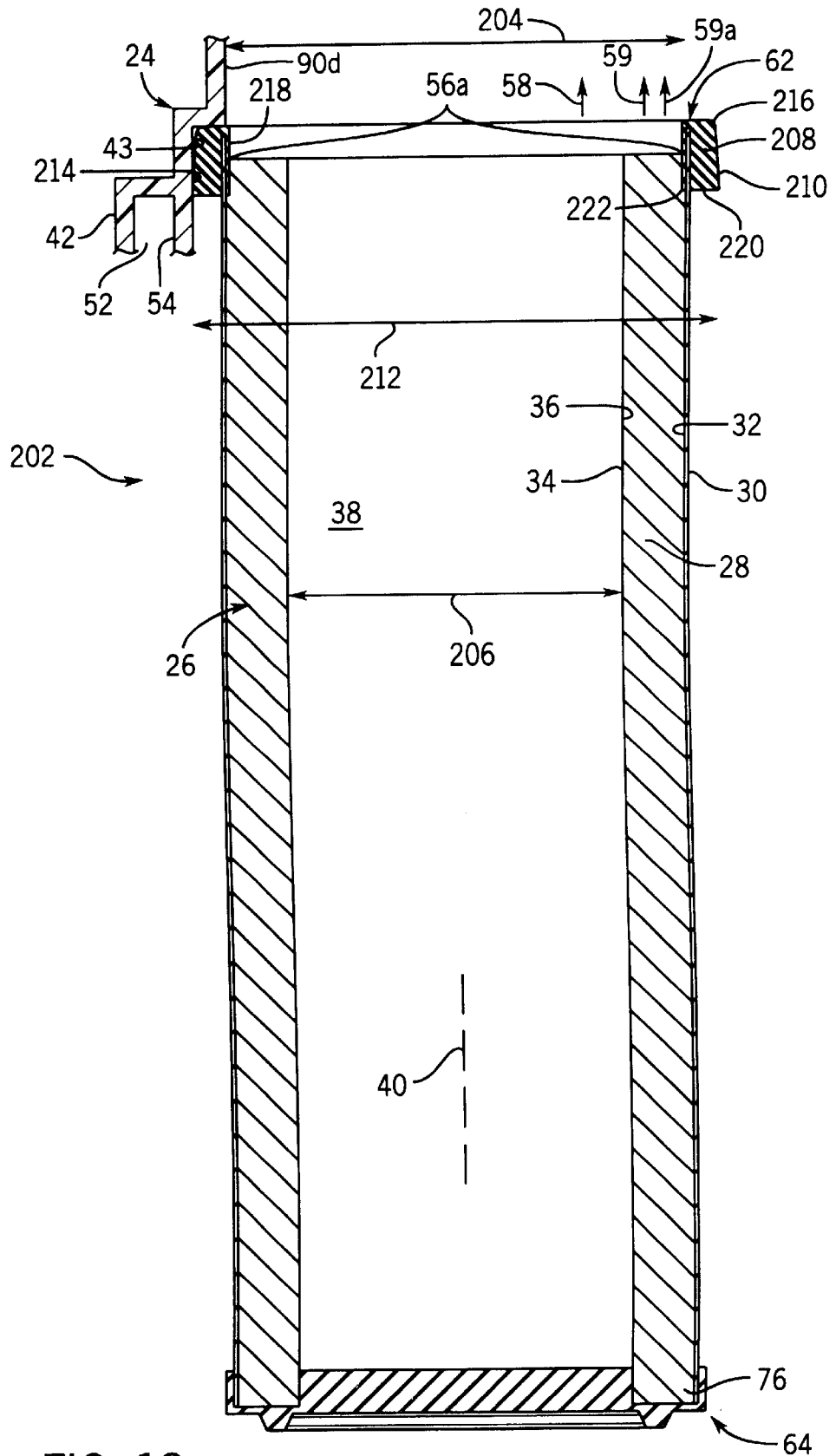
FIG. 12 is a sectional view similar to FIG. 2 but showing a filter element in accordance with the invention of above noted U.S. Ser. No. 09/527,792, filed Mar. 17, 2000, now U.S. Pat. No. 6,261,334.
Figure 13:
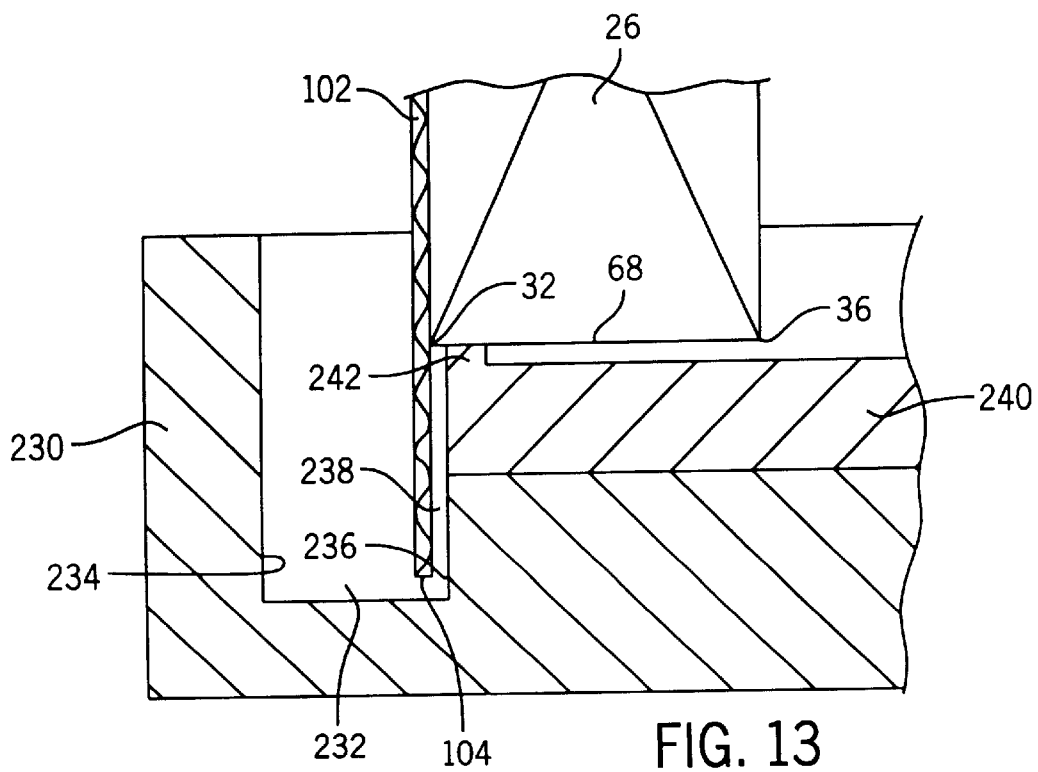
FIG. 13 is like FIG. 11 but shows a mold for molding or potting an end cap onto pleated filter media of the filter element of FIG. 12.
Figure 14:
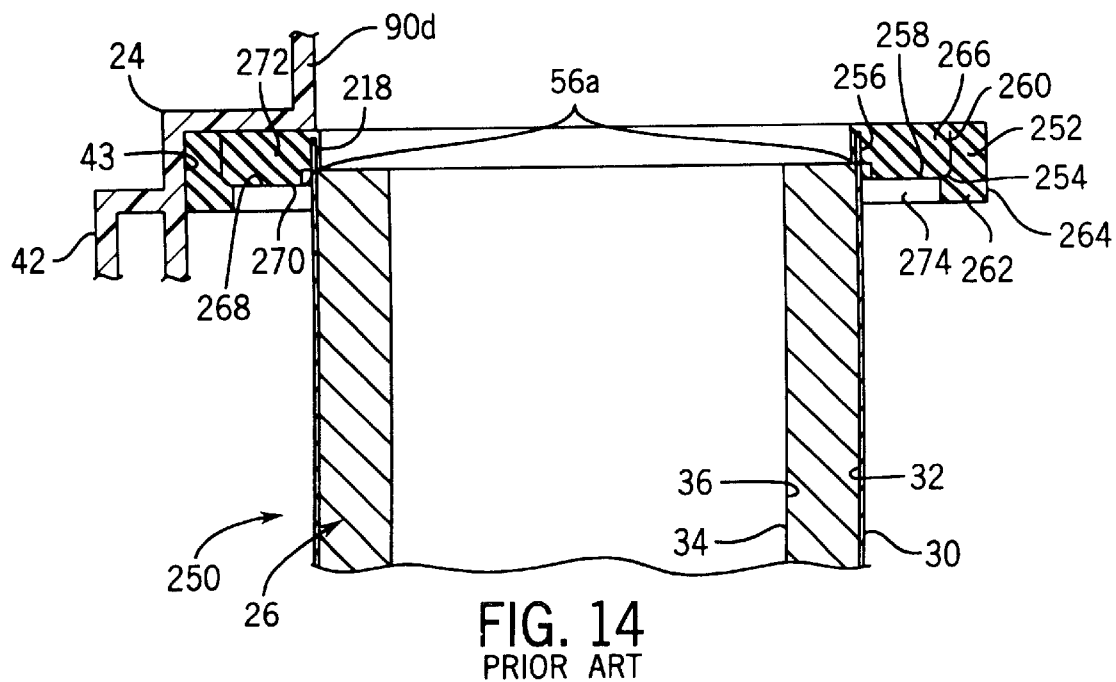
FIG. 14 is like FIG. 12 and shows another embodiment.

FIGS. 12–14 use like reference numerals from above where appropriate to facilitate understanding. FIG. 12 shows a filter element 202 for mounting in housing 24. Filter element 202 is provided by the noted pleated filter media 26 having a plurality of pleats 28 in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along axis 40. Fluid to be filtered flows laterally or radially through filter media 26, and flows axially in hollow interior 38. The filter element has an axial flow passage 56a extending along axis 40 and circumscribing hollow interior 38 and having a flow perimeter as shown at diameter 204 greater than inner perimeter 34 as shown at diameter 206. Filter element 202 has first and second axial ends 62 and 64. First axial end 62 is open and provides the noted axial flow passage 56a therethrough. An end cap 208 of soft compressible resilient material, such as foamed potted urethane, is provided around outer pleat tips 32 at axial end 62 and has an outer perimeter 210 as shown at diameter 212 greater than the outer perimeter 30 of the outer pleat tips 32 as shown at diameter 204 and forming an outer sealing surface 214 external to axial flow passage 56a and engaging inner surface 43 of housing section 42 in radially compressed sealing relation. The axial end 216 of end cap 208 may or may not engage axial endwall 88 of housing section 42 in axially compressed or noncompressed relation. Sealing is accomplished by the radial seal provided by radial compression of end cap 208 between section 104 of outer liner 102 and inner facing surface 43 of the housing and/or the axial seal provided by axial compression of end cap 208 against axial endwall 88 of the housing. Section 104 of outer support liner 102 provides a support backing for compression of radial sealing of end cap 208 thereagainst, as above. Second end cap 76 is provided at second end 64 of the filter element and completely covers the axial ends of the pleats including the outer pleat tips and the inner pleat tips. As above, end cap 76 also includes central section 80 spanning and completely covering the hollow interior of the filter element and closing same.

Outer sealing surface 214 of end cap 208 at outer perimeter 210 faces away from axial flow passage 56a and radially outwardly relative to axis 40. End cap 208 has an inner perimeter 218 as shown at diameter 204 substantially equal to the outer perimeter 30 at outer pleat tips 32 as also shown at diameter 204. The outlet flow tube of the housing, shown at 90 in FIG. 2, is enlarged as shown at 90d in FIG. 12 to the noted diameter 204. This further increases and maximizes flow capacity, and further reduces and minimizes flow restriction. Fluid flows not only at arrows 58 and 59 as above, but also at arrow 59a through the laterally outward portions 72, FIGS. 8, 9, 4, of the axial ends of the pleats, axially through channels 106, FIGS. 6, 7.

End cap 208 encapsulates outer pleat tips 32 and outer support liner 102. End cap 208 has a major margin 220 extending radially outwardly away from outer support liner 102 to outer perimeter 210 of end cap 208. End cap 208 has a minor margin 222 extending radially inwardly from outer support liner 102 to the inner perimeter 218 of the end cap. Minor margin 222 encapsulates outer pleat tips 32. The radial or lateral extension of major margin 220 is substantially longer than the radial or lateral extension of minor margin 222. Inner perimeter 218 of end cap 208 is substantially equal to outer perimeter 30 at outer pleat tips 32, the difference being the length or radial extension of minor margin 222.

Inner perimeter 34 at inner pleat tips 36 defines and bounds a first cross-sectional area. Inner perimeter 218 of end cap 208 defines the flow perimeter as shown at diameter 204 of axial flow passage 56a. Inner perimeter 218 of end cap 208 defines and bounds a second cross-sectional area. Outer perimeter 30 at outer pleat tips 32 defines and bounds a third cross-sectional area. The difference between the noted first and second cross-sectional areas is substantially greater than the difference between the noted second and third cross-sectional areas.

As above, fluid to be filtered flows laterally inwardly through filter media 26 from outer perimeter 30 at outer pleat tips 32 to inner perimeter 34 at inner pleat tips 36 and then flows axially in hollow interior 38 and then out through flow passage 56a and housing outlet tube 90d. Flow passage 56a is thus an outlet flow passage. In an alternate embodiment, fluid to be filtered flows axially into the housing through flow tube 90d then axially along flow passage 56a into hollow interior 38 and then flows laterally outwardly through filter media 26 from inner perimeter 34 at inner pleat tips 36 to outer perimeter 30 at outer pleat tips 32. In this embodiment, flow passage 56a is an inlet flow passage. The structure provides the axial flow as shown at arrow 58 in FIG. 4 and the axial flow as shown at arrow 59, and further provides additional axial flow as shown at arrow 59a in FIG. 12. The latter is due to the substantial removal of the radial extension of the end cap 208 from the axial ends 68 of the pleats in combination with moving the sealing function to outer periphery 210 and/or 216, FIG. 12, compared to the end cap of FIGS. 2 and 4 with inwardly facing radial sealing surface 70 and/or axial sealing surface 86, and end cap portion 116 covering the axial ends of the pleats and blocking otherwise available flow passage area. The extra flow enabled as shown at arrow 59a in FIG. 12 is in addition to the extra flow 59 provided by the structure of FIGS. 1–11. The structure of FIG. 12 thus further increases and maximizes flow capacity, and further reduces and minimizes flow restriction.

FIG. 13 is similar to FIG. 11 and shows a mold 230 for molding or potting end cap 208 onto pleated filter media 26 of the filter element. The mold has a trough 232 extending along an annulus and holding liquid castable material, such as urethane, therein into which axial ends 68 of pleats 28 are dipped. Annular trough 232 has an outer perimeter 234 defining outer perimeter 210 of end cap 208, and an inner perimeter 236 defining inner perimeter 218 of end cap 208. It is preferred that there be a minimal gap 238 between inner perimeter 236 and outer support liner 102 of the filter element to encapsulate end section 104 of liner 102 and to encapsulate outer pleat tips 32 along their axial ends 68. It is preferred that gap 238 be kept to a minimum, such that inner perimeter 236 is substantially equal to perimeter 30. In other embodiments, the radial length of gap 238 is zero, i.e. there is no gap between inner perimeter 236 and outer liner 102. The mold has an insert 240 with an upstanding dam 242 extending along inner perimeter 236 and having an axial end engaging axial ends 68 of the pleats and impeding flow of liquid castable material laterally radially inwardly towards inner pleat tips 36. The pleated filter media is dipped into the liquid castable material in the mold by lowering the pleated filter media downwardly until axial ends 68 of the pleats are engaged by dam 242, and then pushing the pleated filter media further slightly downwardly against the dam such that the dam slightly deforms axial ends 68 of the pleats at such engagement point which in turn pushes the pleat sidewalls forming the noted channels slightly laterally to further block the channels and further impede flow of liquid castable material laterally inwardly towards inner pleat tips 36.

FIG. 14 is like FIG. 12 and shows another embodiment and uses like reference numerals where appropriate to facilitate understanding. Filter element 250 has an end cap 252 with a metal support extension member 254 embedded therein during the noted molding. The support extension member has a first leg 256 along outer support liner 102 at outer pleat tip 32, a second leg 258 extending radially outwardly from leg 256, and a third leg 260 providing a support backing for compression of sealing portion 262 of the end cap thereagainst. Sealing portion 262 is between leg 260 and outer sealing surface 264 and is spaced radially outwardly of outer pleat tips 32 by a radial gap 266 between legs 256 and 260. Leg 258 has first and second sides 268 and 270 facing axially in opposite directions and defining, in combination with legs 256 and 260, the noted radial gap 266. End cap 252 has a first portion 272 in radial gap 266, and a second portion 262 radially outwardly thereof and providing the noted sealing portion. Second side 270 of leg 258 faces an open radial gap 274 between outer pleat tips 32 and portion 262 of end cap 252. Open radial gap 274 is unfilled by the potting material of end cap 252. Legs 256, 258, 260 define a U-shaped support extension member 254, second leg 258 being the bight of the U, and first and third legs 256 and 260 extending axially and generally parallel to one another.

FIG. 15 shows a full flow fluid filter 300 having a housing 302 extending axially along an axis 304. The housing has an inlet 306, a main body 308, and an outlet 310. Housing 302 is preferably plastic and typically cylindrical, and the housing sections are mounted to each other in conventional mariner such as by bolts 312, 314, or in other conventional manners such as overcenter spring clip type clamps, or the like. Filter element 318 in the housing is provided by pleated filter media, as above, having a plurality of pleats, such as 28, FIGS. 5–9, in a closed loop, typically an annulus, having an outer perimeter 320 defined by a plurality of outer pleat tips, such as 32, FIGS. 5–9, and an inner perimeter 322 defined by a plurality of inner pleat tips, such as 36, FIGS. 5–9. The annular closed loop has a hollow interior 324 extending along axis 304. The pleats of filter media form wall segments extending in serpentine manner between the inner and outer pleat tips 36 and 32. The wall segments extend axially between upstream ends 326 and downstream ends 328. The wall segments define axial flow channels therebetween. The upstream ends of the wall segments are alternately sealed to each other, as above, to define a first set of exterior flow channels such as 108 open at their upstream ends 326, and a second set of interior flow channels such as 106 interdigitated with flow channels 108 and closed at upstream ends 326. The downstream ends 328 of the wall segments are alternately sealed to each other such that the first set of exterior flow channels 108 have closed downstream ends, and the second set of interior flow channels 106 have open downstream ends.

Fluid to be filtered flows substantially directly axially through filter element 318, as shown at arrows 330. The fluid flows through inlet 306 then through open upstream ends 326 of exterior flow channels 108 then through the filter media wall segments of pleats 28 then through open downstream ends 328 of interior flow channels 106 then through outlet 310. Exterior flow channels 108 face outwardly away from hollow interior 324 and are open at outer perimeter 320. Fluid from inlet 306 additionally flows into annular gap 332 between housing section 308 and filter element 318, and then flows into exterior channels 108 through outer perimeter 320. Interior flow channels 106 are open at inner perimeter 322, such that fluid additionally flows out of interior channels 106 through inner perimeter 322 into hollow interior 324. A prefilter 334 is provided around the upstream side of filter element 318 at upstream ends 326 of the pleated wall segments and at the outer pleat tips 32 at outer perimeter 320.

Filter element 318 is sealed in housing 302 by tandem radial seals including an inner radial seal gasket 336 sealing filter element 318 to the housing at the inner pleat tips at inner perimeter 322, and an outer radial seal gasket 338 sealing filter 318 to the housing at the outer pleat tips at outer perimeter 320. Inner radial seal 336 bears radially against surface 340 of streaming cap 342 mounted to housing inlet 306 by ribs or webs 344. Gasket 336 also includes an axial sealing section 346 bearing axially against flange 348 of streaming cap 342, to preferably provide both radial and axial sealing. Outer radial seal gasket 338 bears radially against housing shoulder 350, and also includes an axial sealing section 352 bearing axially against flange 354 of the housing to provide axial sealing thereagainst, to thus provide both radial and axial sealing.

Streaming cap 342 covers hollow interior 324 at the upstream end and extends axially outwardly away therefrom, which is rightwardly in FIG. 15, and is sealed to filter element 318 as above described. Streaming cap 342 is configured to stream incoming fluid flow as shown at arrows 356 to the open upstream ends of exterior flow channels 108. Streaming cap 342 is mounted to the housing by the noted ribs or webs 344 and supports and locates the upstream end of filter element 318. In an alternate embodiment, streaming cap 342 is not mounted to the housing, and instead other support and location structure may be used for the filter element. Streaming cap 342 has an axially extending inner portion 340 extending into hollow interior 324 and radially sealed against inner pleat tips 36 at inner perimeter 322 by the noted radial seal 336. Streaming cap 342 has a radially extending flange portion 348 extending partially along and axially sealed against the upstream ends 326 of the flow channel wall segments by gasket section 346.

Figure 16:
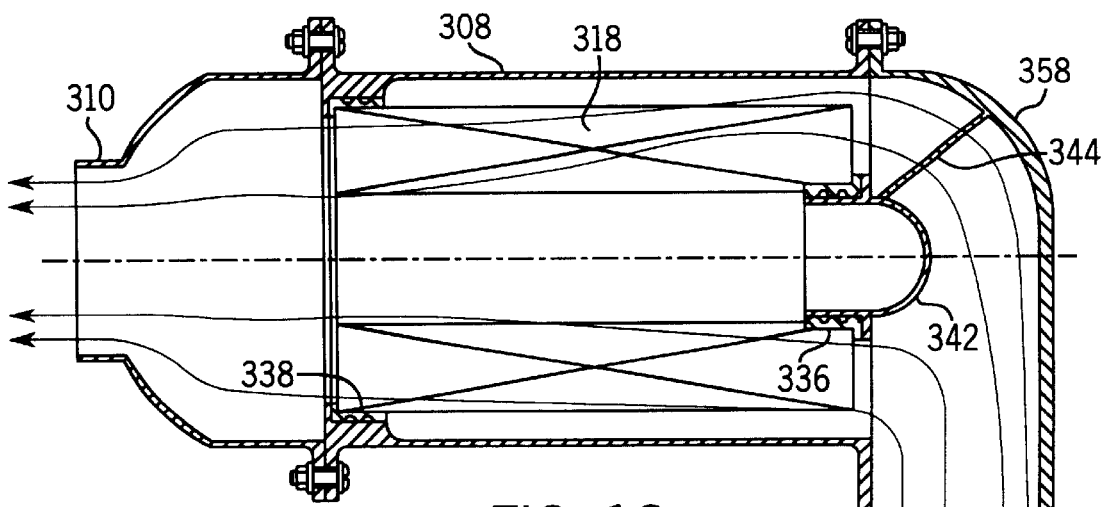
FIG. 16 is like FIG. 15 and shows another embodiment.

FIG. 16 shows another embodiment and uses like reference numerals from above where appropriate to facilitate understanding. Housing inlet 306 of FIG. 15 is replaced in FIG. 16 by an angled or tangential inlet 358.

In each of the embodiments, the fluid flow direction may be reversed, i.e. the fluid may flow left to right in the orientation of FIGS. 15, 16, in which case ends 328 of the pleated filter media wall segments are the upstream ends, and ends 326 are the downstream ends. In FIGS. 15, 16, filter element 318 is cylindrical. In further embodiments, such filter element may be frustoconical.

Present Invention

FIGS. 17–27 use like reference numerals from above where appropriate to facilitate understanding.

FIGS. 17–22 show a filter 400 including main or primary filter element 22 and a safety filter element 402 contained within housing 24. As above, main filter element 22 is provided by pleated filter media 26 having a plurality of pleats 28 in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along axis 40. Fluid to be filtered flows through main filter element 22 as shown at arrows 112, 114 from the upstream dirty side 30 to the downstream clean side 34, and flows axially as shown at arrow 58 in hollow interior 38. Main filter element 22 has an axial flow passage 56 extending along axis 40 and circumscribing hollow interior 38 and having a flow perimeter 60 greater than inner perimeter 34. Safety filter element 402 is downstream of main filter element 22 and filters both the axial flow 58 in hollow interior 38 and additional flow 59 between flow perimeter 60 and inner perimeter 34.

Additional flow 59 between flow perimeter 60 and inner perimeter 34 flows axially from main filter element 22 to safety filter element 402. Main filter element 22 has first and second axial ends 62 and 64. First axial end 62 is open and provides axial flow passage 56 therethrough. Safety filter element 402 includes a portion 404 at first axial end 62 of main filter element 22 and outside of hollow interior 38 and axially aligned with the area between flow perimeter 60 and inner perimeter 34. Inner perimeter 34 defines and bounds a first cross-sectional area. Flow perimeter 60 defines and bounds a second cross-sectional area which is greater than the noted first cross-sectional area. The difference between the second and first cross-sectional areas defines a third cross-sectional area common with a portion of the second cross-sectional area and circumscribing the first cross-sectional area. The third cross-sectional area is bounded by flow perimeter 60 and inner perimeter 34 and defines an additional flow passage 406 for additional flow 59. Portion 404 of safety filter element 402 at first axial end 62 of main filter element 22 is axially aligned with the noted third cross-sectional area bounded by flow perimeter 60 and inner perimeter 34 and defining additional flow passage 406 for additional flow 59.

Safety filter element 402 has first and second closed loop portions 408 and 404. First closed loop portion 408 is in hollow interior 38 of main filter element 22. Second closed loop portion 404 is exterior of hollow interior 38 of main filter element 22 and covers the area between flow perimeter 60 and inner perimeter 34 at first axial end 62 of main filter element 22. End cap 66 at first axial end 62 of main filter element 22 has an inner perimeter 70 facing closed loop portion 404 of safety filter element 402. End cap 66 partially covers the axial ends 68 of the pleats such that the laterally outward portions 72 of the axial ends of the pleats are covered by end cap 66 but not the laterally inward portions 74 of the axial ends of the pleats. The laterally inward portions 74 of the axial ends of the pleats are covered by closed loop portion 404 of safety filter element 402.

In preferred form, both closed loop portions 408 and 404 of safety filter element 402 are pleated, though other embodiments are possible wherein only one is pleated, or neither are pleated. Closed loop portion 408 is provided by pleated filter media 410, FIG. 21, having a plurality of pleats 412 in a closed loop having a first outer subperimeter 414 defined by a plurality of outer pleat tips 416, and a first inner subperimeter 418 defined by a plurality of inner pleat tips 420. An inner liner 422 of expanded wire mesh or screen or perforated metal extends along inner perimeter 418. Portion 404 of the safety filter element is provided by pleated filter media 424, FIG. 22, having a plurality of pleats 426 in a closed loop having a second outer subperimeter 428, FIG. 20, and a second inner subperimeter 430. Outer subperimeter 414 of portion 408 of the safety filter element is less than or equal to inner perimeter 34 of main filter element 22. Outer subperimeter 428 of portion 404 of the safety filter element is less than or equal to outer perimeter 30 of main filter element 22. Outer subperimeter 414 is substantially equal to inner subperimeter 430. Outer subperimeter 428 is substantially equal to flow perimeter 60. Inner and outer pleat tips 36 and 32 of main filter element 22 extend along axially extending fold lines, i.e. parallel to axis 40. Pleat tips 432 and 434, FIGS. 20 and 22, of portion 404 of the safety filter element extend along radially extending fold lines relative to axis 40. The fold lines of the pleat tips 432, 434 of portion 404 of the safety filter element extend perpendicularly to the fold lines of the pleat tips 416 and 418 of portion 408 of the safety filter element.

Portion 408 of safety filter element 402 is in hollow interior 38 of main filter element 22 and has first and second axial ends 436 and 438, FIG. 19. Axial end 436 of the safety filter element is adjacent axial end 62 of main filter element 22, and axial end 438 is adjacent axial end 64. Axial end 436 of the safety filter element is open and provides an axial flow exit passage therethrough as shown at arrow 58. Axial end 438 of portion 408 of the safety filter element is closed and covered by end cap 440 abutting end cap 76 of main filter element 22. Axial end 436 of portion 408 of the safety filter element has an end cap 442 with a portion 444 covering and closing the axial ends of pleats 412, and a portion 446 engaging and holding in potted relation the radially inner ends of pleats 426 of portion 404 of the safety filter element. An outer end cap 448 engages and holds in potted relation the radially outer ends of pleats 426 of portion 404 of the safety filter element. In the embodiment in FIG. 20, an additional annular gasket 450 is provided around end cap 448 and provides a seal against flange or inner section 96 of outlet flow tube 90 at axial end 88 of the housing. In another embodiment, gasket 450 is eliminated or formed as part of end cap 448 radially and sealingly engaged against flange 96. Flange 96 extends axially between end caps 66 and 448 and is sealed respectively thereagainst. Outer surface 70 of flange 96 seals against end cap 66. Inner surface 98 of flange 96 seals against end cap 448 which may include gasket 450 provided as part thereof.

Outer portion 404 of the safety filter element is provided at axial end 436 adjacent axial end 62 of main filter element 22 and outside of hollow interior 38 and axially aligned with the area between flow perimeter 60 and inner perimeter 34. Outer surface 70 of flange 96 maintains the seal against end cap 66 of main filter element 22 regardless of whether end cap 448 is sealed at inner surface 98 of flange 96. Likewise, inner surface 98 of flange 96 maintains the seal against end cap 448, regardless of whether end cap 66 is sealed against outer surface 70 of flange 96. The noted independent sealing is desirable to maintain protection of the equipment or machine, such as an internal combustion engine, during servicing. When removing and replacing main filter element 22, it is desired that safety filter element 402 remain sealed to inner flange section 96 of outlet flow tube 90 of axial end 88 of the housing. Main filter element 22 is removed axially leftwardly as shown at arrow 451 in FIG. 23, after removing housing section 44 from housing section 42. Main filter element 22 is typically turned or twisted about axis 40 to crack or break the seal between end cap 66 and outer surface 70 of flange 96. There is little or no room for lateral rocking back and forth of main filter element 22 at 452 and 454 relative to axis 40 because of the close tolerances within hollow interior 38 between inner perimeter 34 of main filter element 22 and outer perimeter 414 of portion 408 of the safety filter element. In FIG. 24, safety filter element 402 is provided with an inner portion 456 which is tapered along axis 40 from a wider radial width at axial end 436 to a narrow radial width at axial end 438, to provide increased lateral clearance 458 of axial end 438 of the safety filter element within hollow interior 38 at axial end 64 of main filter element 22 to facilitate lateral rocking back and forth at 452, 454 of end 64 of main filter element 22 to facilitate removal of the main filter element without removing safety filter element 402 during servicing. FIG. 25 shows a further embodiment with tapered inner portion 458 of the safety filter element, and eliminating end cap 440. FIG. 26 shows a further embodiment with a tapered inner portion 460 of the safety filter element in a bag-like configuration.

FIG. 27 shows a filter 500 and uses like reference numerals from above where appropriate to facilitate understanding. The filter includes main or primary filter element 318 and safety filter element 402 in housing 502 having housing sections 504 and 506 mounted to each other in conventional manner as shown at 508 by clamps, bolts, overcenter latches, bayonet couplings, or the like. Streaming cap 510 is comparable to streaming cap 342, FIG. 15, and is mounted to the housing by ribs or webs 512 comparably to ribs or webs 344 and supports an end cap or hub 514 spanning and sealingly closing hollow interior 324 and supporting axial end 326 of main filter element 318. Pre-filter 334, FIGS. 15, may be included in the construction of FIG. 27 if desired. Safety filter element 402 includes a support cage 516 having a plurality of radial spokes or ribs 518 extending between inner annular rim 520 and outer annular rim 522 respectively supporting inner liner 422 and gasket 448.

The invention further provides a filter 402, FIGS. 18, 23–26, providing an additional flow path 59 for reduced overall restriction and increased filtering surface area. Filter 402 includes first and second filter elements 408 and 404 in alternate flow path relationship, namely non-serial flow path relationship. Filter element 404 provides the noted additional flow path 59, FIG. 23, therethrough, which is non-parallel to flow direction 114 through filter element 408. Filter element 404 has an upstream face 550 lying in a rectilinear plane 552 perpendicular to flow direction 59. Filter element 408 has an upstream face 554 lying in an arcuate plane 556, FIG. 18, tangent to the flow direction 114, FIG. 23, through filter element 408. The flow through filter 402 flows through first and second alternate branches at flow directions 114 and 59. The second branch provides the noted additional flow path 59. The first branch has a first radial path at 114 and a second axial path at 58 in serial flow relationship. The radial flow at 114 is perpendicular to arcuate plane 556 and parallel to rectilinear plane 552 and perpendicular to flow direction 59. The noted path at 58 is perpendicular to plane 552 and parallel to flow direction 59.

Filter 402 has the noted closed loop filter element 408 extending axially along axis 40 between first and second axial ends 558 and 560, FIGS. 18, 23. Closed loop filter element 404 is at axial end 558. Flow through filter 402 flows radially at 114, FIG. 23, through filter element 408, and axially at 59 through filter element 404. Filter element 408 has a center at axis 40 and surrounds the noted hollow interior. Filter element 404 has a center at axis 40. Flow through filter element 404 flows through the noted first and second branches at flow paths 114 and 59 in alternate flow path relationship, namely non-serial flow path relationship.

Filter element 408 has an outer perimeter 414, FIGS. 23, 21, surrounding an inner perimeter 418. Filter element 404 has an outer perimeter at outer pleat ends 428 surrounding an inner perimeter at inner pleat ends 430. The outer perimeter at 428 is greater than outer perimeter 414 and defines the noted additional flow passage at radial perimeteral gap 406 therebetween. Axial flow path 59 is through gap 406. Filter element 408 is a pleated filter element 410, FIG. 21, extending axially along axis 40 between distally opposite axial ends 558 and 560, and has a plurality of pleats 412 extending radially between inner pleat tips 420 at inner bend lines and outer pleat tips 416 at outer bend lines, which inner and outer bend lines extend axially. Filter element 404 is a pleated filter element 424, FIG. 22, having a plurality of pleats 426 extending axially between a first set of pleat tips 432 at a first set of bend lines, and a second set of pleat tips 434 at a second set of bend lines, which first and second sets of bend lines extend radially. Pleats 426 of filter element 404 have radially distally opposite inner and outer radial ends 430 and 428, FIG. 23. Filter element 408 has the noted outer perimeter 414 at outer pleat tips 416 surrounding inner perimeter 418 at inner pleat tips 420. Filter element 404 has the noted outer perimeter at 428 at the outer radial ends of pleats 426 surrounding the noted inner perimeter at 430 at the inner radial ends of pleats 426. The outer perimeter at 428 is greater than outer perimeter 414 and defines the noted radial perimeteral gap 406 therebetween through which the noted additional axial flow path is provided at 59. The radially extending bend lines of pleat tips 432 and 434 are perpendicular to the axially extending bend lines of pleat tips 420 and 416. Pleats 412 form the annulus of filter element 408, which annulus extends axially along axis 40. Pleats 426 form the annulus of filter element 404. The annulus at 404 is concentric to the annulus at 408. End cap 440 may be fluid impermeable, or alternatively may be a fluid permeable filtering end cap.

It is recognized that various equivalents, alternatives and modifications are possible within the scope of the appended claims.

What is claimed is:

1. A filter comprising a pleated main filter element having a plurality of pleats in a closed loop having an outer perimeter defined by a plurality of outer pleat tips, and an inner perimeter defined by a plurality of inner pleat tips, said loop having a hollow interior extending along a given axis, wherein fluid to be filtered flows through said main filter element from an upstream dirty side to a downstream clean side, and flows axially in said hollow interior, said main filter element having an axial flow passage extending along said axis and circumscribing said hollow interior and having a flow perimeter greater than said inner perimeter, a safety filter element downstream of said main filter element and filtering both the axial flow in said hollow interior and additional flow between said flow perimeter and said inner perimeter, wherein said main filter element has first and second axial ends, said first axial end being open and providing said axial flow passage therethrough, said safety filter element includes a portion at said first axial end of said main filter element and outside of said hollow interior and axially aligned with the area between said flow perimeter and said inner perimeter, and wherein said inner perimeter defines and bounds a first cross-sectional area, said flow perimeter defines and bounds a second cross-sectional area, said second cross-sectional area, is greater than said first cross-sectional area, the difference between said second and first cross-sectional areas defines a third cross-sectional area common with a portion of said second cross-sectional area and circumscribing said first cross-sectional area, said third cross-sectional area being bounded by said flow perimeter and said inner perimeter and defining an additional flow passage for said additional flow, and wherein said portion of said safety filter element at said first axial end of said main filter element is axially aligned with said third cross-sectional area.

2. A filter comprising a pleated main filter element having a plurality of pleats in a closed loop having an outer perimeter defined by a plurality of outer pleat tips, and an inner perimeter defined by a plurality of inner pleat tips, said loop having a hollow interior extending along a given axis, wherein fluid to be filtered flows through said main filter element from an upstream dirty side to a downstream clean side, and flows axially in said hollow interior, said main filter element having an axial flow passage extending along said axis and circumscribing said hollow interior and having a flow perimeter greater than said inner perimeter, a safety filter element downstream of said main filter element and filtering both the axial flow in said hollow interior and additional flow between said flow perimeter and said inner perimeter, wherein said main filter element has first and second axial ends, said first axial end being open and providing said axial flow passage therethrough, said safety filter element includes a portion at said first axial end of said main filter element and outside of said hollow interior and axially aligned with the area between said flow perimeter and said inner perimeter, and wherein said safety filter element has first and second closed loop portions, said first closed loop portion of said safety filter element is in said hollow interior of said main filter element, said second closed loop portion of said safety filter element is exterior of said hollow interior of said main filter element and covers the area between said flow perimeter and said inner perimeter at said first axial end of said main filter element.

3. The invention according to claim 2 comprising an end cap at said first axial end of said main filter element, said end cap having an inner perimeter facing said second closed loop portion of said safety filter element.

4. The invention according to claim 3 wherein said end cap partially covers the axial ends of said pleats such that the laterally outward portions of said axial ends of said pleats are covered by said end cap but not the laterally inward portions of said axial ends of said pleats, and wherein said laterally inward portions of said axial ends of said pleats are covered by said second closed loop portion of said safety filter element.

5. The invention according to claim 2 wherein at least one of said first and second closed loop portions of said safety filter element is pleated.

6. The invention according to claim 5 wherein both of said first and second closed loop portions of said safety filter element are pleated.

7. The invention according to claim 6 wherein said first closed loop portion of said safety filter element comprises pleated filter media having a plurality of pleats in a closed loop having a first outer subperimeter defined by a plurality of outer pleat tips, and a first inner subperimeter defined by a plurality of inner pleat tips, said second portion of said safety filter element comprises pleated filter media having a plurality of pleats in a closed loop having a second outer subperimeter and a second inner subperimeter, said first outer subperimeter is less than or equal to said inner perimeter of said main filter element, said second outer subperimeter is less than or equal to said outer perimeter of said main filter element.

8. The invention according to claim 7 wherein said first outer subperimeter is substantially equal to said second inner subperimeter.

9. The invention according to claim 7 wherein said second outer subperimeter is substantially equal to said flow perimeter.

10. The invention according to claim 7 wherein said pleat tips of said main filter element extend along axially extending fold lines, said pleat tips of said first portion of said safety filter element extend along axially extending fold lines, and said second portion of said safety filter element has pleat tips extending along radially extending fold lines relative to said axis.

11. A filter comprising a pleated main filter element having a plurality of pleats in a closed loop having an outer perimeter defined by a plurality of outer pleat tips, and an inner perimeter defined by a plurality of inner pleat tips, said loop having a hollow interior extending along a given axis, wherein fluid to be filtered flows through said main filter element from an upstream dirty side to a downstream clean side, and flows axially in said hollow interior, said main filter element having an axial flow passage extending along said axis and circumscribing said hollow interior and having a flow perimeter greater than said inner perimeter, a safety filter element downstream of said main filter element and filtering both the axial flow in said hollow interior and additional flow between said flow perimeter and said inner perimeter, wherein said main filter element has first and second axial ends, said first axial end is open and provides an axial flow exit passage therethrough, said safety filter element is in said hollow interior downstream of said main filter element and has first and second axial ends, said first axial end of said safety filter element is adjacent said first axial end of said main filter element, said first axial end of said safety filter element is open and provides an axial flow exit passage therethrough, and comprising a first end cap at said first axial end of said main filter element, and a second end cap at said first axial end of said safety filter element, and wherein said filter is mounted in a housing having an axial end with a flange extending axially between said first and second end caps and sealed respectively thereagainst, said flange having an outer surface sealed against said first end cap, said flange having an inner surface sealed against said second end cap.

12. The invention according to claim 11 wherein said safety filter element includes an outer portion at said first axial end thereof adjacent said first axial end of said main filter element and outside of said hollow interior and axially aligned with the area between said flow perimeter and said inner perimeter, and wherein said second end cap is at said outer portion.

13. The invention according to claim 12 wherein said outer surface of said flange maintains the seal against said first end cap regardless of whether said second end cap is sealed against said inner surface of said flange, and wherein said inner surface of said flange maintains the seal against said second end cap regardless of whether said first end cap is sealed against said outer surface of said flange.

14. The invention according to claim 2 wherein at least one of said first and second closed loop portions of said safety filter element is unpleated.

15. The invention according to claim 14 wherein both of said first and second closed loop portions of said safety filter element are unpleated.

16. A filter comprising a pleated main filter element having a plurality of pleats in a closed loop having an outer perimeter defined by a plurality of outer pleat tips, and an inner perimeter defined by a plurality of inner pleat tips, said loop having a hollow interior extending along a given axis, wherein fluid to be filtered flows through said main filter element from an upstream dirty side to a downstream clean side, and flows axially in said hollow interior, said main filter element having first and second axial ends, said first axial end being open and providing an axial flow exit passage therethrough, a safety filter element in said hollow interior downstream of said main filter element and having first and second axial ends, said first axial end of said safety filter element being adjacent said first axial end of said main filter element, said first axial end of said safety filter element being open and providing an axial flow exit passage therethrough, said safety filter element being tapered along said axis from a wider radial width at said first axial end to a narrower radial width at said second axial end, to provide lateral clearance of said second axial end of said safety filter element within said hollow interior at said second axial end of said main filter element to facilitate lateral rocking back and forth of said second end of said main filter element to facilitate removal of the latter without removing said safety filter element during servicing.

17. The invention according to claim 16 wherein said main filter element has an axial flow passage extending along said axis and circumscribing said hollow interior and having a flow perimeter greater than said inner perimeter, said safety filter element has first and second closed loop portions, said first closed loop portion of said safety filter element is in said hollow interior of said main filter element and has said taper, said second closed loop portion of said safety filter element is exterior of said hollow interior of said main filter element and covers the area between said flow perimeter and said inner perimeter at said first axial end of said main filter element.

18. The invention according to claim 17 comprising a first end cap at said first axial end of said main filter element, a second end cap at said first axial end of said safety filter element, and wherein said filter is mounted in a housing having a axial end with a flange extending axially between said first and second end caps and sealed respectively thereagainst, said flange having an outer surface sealed against said first end cap, and an inner surface sealed against said second end cap, said outer surface of said flange maintaining the seal against said first end cap regardless of whether said second end cap is sealed against said inner surface of said flange, said inner surface of said flange maintaining the seal against said second end cap regardless of whether said first end cap is sealed against said outer surface of said flange.

19. A fluid filter comprising a housing extending axially along an axis, a pleated main filter element having a plurality of pleats in a closed loop having an outer perimeter defined by a plurality of outer pleat tips, and an inner perimeter defined by a plurality of inner pleat tips, said loop having a hollow interior extending along said axis, wherein fluid to be filtered flows through said main filter element from an upstream dirty side to a downstream clean side, said pleats forming wall segments extending in serpentine manner between said inner and outer pleat tips, said wall segments extending axially between upstream and downstream ends, said wall segments defining axial flow channels therebetween, said upstream ends of said wall segments being alternately sealed to each other to define a first set of flow channels open at their upstream ends, and a second set of flow channels interdigitated with said first set of flow channels and closed at said upstream ends, said downstream ends of said wall segments being alternately sealed to each other such that said first set of flow channels have closed downstream ends, and said second set of flow channels have open downstream ends, such that fluid flows substantially directly axially through said main filter element, through said open upstream ends of said first set of flow channels then through said wall segments then through said open downstream ends of said second set of flow channels, a safety filter element in said housing downstream of said main filter element, wherein said safety filter element is a closed loop member having at least a portion thereof axially aligned with said flow channels, and wherein said closed loop safety filter element has a hollow interior axially aligned with said hollow interior of said main filter element.

20. The invention according to claim 19 wherein said hollow interior of said safety filter element is closed by a fluid permeable filtering end cap.

21. The invention according to claim 19 wherein said hollow interior of said safety filter element is closed by a fluid impermeable end cap.

22. A fluid filter comprising a housing extending axially along an axis, a pleated main filter element having a plurality of pleats in a closed loop having an outer perimeter defined by a plurality of outer pleat tips, and an inner perimeter defined by a plurality of inner pleat tips, said loop having a hollow interior extending along said axis, wherein fluid to be filtered flows through said main filter element from an upstream dirty side to a downstream clean side, said pleats forming wall segments extending in serpentine manner between said inner and outer pleat tips, said wall segments extending axially between upstream and downstream ends, said wall segments defining axial flow channels therebetween, said upstream ends of said wall segments being alternately sealed to each other to define a first set of flow channels open at their upstream ends, and a second set of flow channels interdigitated with said first set of flow channels and closed at said upstream ends, said downstream ends of said wall segments being alternately sealed to each other such that said first set of flow channels have closed downstream ends, and said second set of flow channels have open downstream ends, such that fluid flows substantially directly axially through said main filter element, through said open upstream ends of said first set of flow channels then through said wall segments then through said open downstream ends of said second set of flow channels, a safety filter element in said housing downstream of said main filter element, wherein said second set of flow channels are interior flow channels facing inwardly toward said hollow interior and are open at said inner perimeter such that fluid additionally flows through said inner perimeter, and wherein said safety filter element has a first portion filtering fluid flow in said hollow interior crossing said inner perimeter, and a second portion filtering said flow through said open downstream ends of said second set of flow channels.

23. The invention according to claim 22 wherein said first portion of said safety filter element is in said hollow interior of said main filter element, and said second portion of said safety filter element is outside of said hollow interior and axially aligned with said open downstream ends of said second set of flow channels.

24. The invention according to claim 23 wherein said open downstream ends of said second set of flow channels define a flow perimeter greater than said inner perimeter.

25. The invention according to claim 24 wherein said inner perimeter defines and bounds a first cross-sectional area, said flow perimeter defines and bounds a second cross-sectional area, said second cross-sectional area is greater than said first cross-sectional area, the difference between said second and first cross-sectional areas defines a third cross-sectional area common with a portion of said second cross-sectional area and circumscribing said first cross-sectional area, said third cross-sectional area being bounded by said flow perimeter and said inner perimeter, and wherein said second portion of said safety filter element is axially aligned with said third cross-sectional area.

26. The invention according to claim 24 wherein said main filter element has first and second axial ends, and comprising an end cap at said first axial end of said main filter element, said end cap having an inner perimeter facing said second portion of said safety filter element.

27. The invention according to claim 26 wherein said end cap partially covers the axial ends of said pleats such that the laterally outward portions of said axial ends of said pleats are covered by said end cap, but not the laterally inward portions of said axial ends of said pleats, and wherein said laterally inward portions of said axial ends of said pleats are covered by said second portion of said safety filter element.

28. The invention according to claim 24 wherein at least one of said first and second portions of said safety filter element is pleated.

29. The invention according to claim 28 wherein both of said first and second portions of said safety filter element are pleated.

30. The invention according to claim 29 wherein said first portion of said safety filter element comprises pleated filter media having a plurality of pleats in a closed loop having a first outer sub-perimeter defined by a plurality of outer pleat tips, and a first inner sub-perimeter defined by a plurality of inner pleat tips, said second portion of said safety filter element comprises pleated filter media having a plurality of pleats in a closed loop having a second outer sub-perimeter and a second inner sub-perimeter, said first outer sub-perimeter is less than or equal to said inner perimeter of said main filter element, said second outer sub-perimeter is less than or equal to the outer perimeter of said main filter element.

31. The invention according to claim 30 wherein said first outer sub-perimeter is substantially equal to said second inner sub-perimeter.

32. The invention according to claim 30 wherein said second outer sub-perimeter is substantially equal to said flow perimeter.

33. The invention according to claim 30 wherein said pleat tips of said main filter element extend along axially extending fold lines, said pleat tips of said first portion of said safety filter element extend along axially: extending fold lines, and said second portion of said safety filter element has pleat tips extending along radially extending fold lines relative to said axis.

34. A fluid filter comprising a housing extending axially along an axis, a pleated main filter element having a plurality of pleats in a closed loop having an outer perimeter defined by a plurality of outer pleats, and an inner perimeter defined by a plurality of inner pleats, said loop having a hollow interior extending along said axis, wherein fluid to be filtered flows through said main filter element from an upstream dirty side to a downstream clean side, said pleats forming wall segments extending in serpentine manner between said inner and outer pleat tips, said wall segments extending axially between upstream and downstream ends, said wall segments defining axial flow channels therebetween, said upstream ends of said wall segments being alternately sealed to each other to define a first set of flow channels open at their upstream ends, and a second set of flow channels interdigitated with said first set of flow channels and closed at said upstream ends, said downstream ends of said wall segments being alternately sealed to each other such that said first set of flow channels have closed downstream ends, and said second set of flow channels have open downstream ends, such that fluid flows substantially directly axially through said main filter element, through said open upstream ends of said first set of flow channels then through said wall segments then through said open downstream ends of said second set of flow channels, a safety filter element in said housing downstream of said main filter element, wherein said main filter element has first and second axial ends, said first axial end is open and provides an axial flow exit passage therethrough, said safety filter element is in said hollow interior downstream of said main filter element and has first and second axial ends, said first axial end of said safety filter element is adjacent said first axial end of said main filter element, said first axial end of said safety filter element is open and provides an axial flow exit passage therethrough, and comprising a first end cap at said first axial end of said main filter element, and a second end cap at said first axial end of said safety filter element, and wherein said filter is mounted in a housing having an axial end with a flange extending axially between said first and second end caps and sealed respectively thereagainst, said flange having an outer surface sealed against said first end cap, said flange having an inner surface sealed against said second end cap.

35. The invention according to claim 34 wherein said open downstream ends of said second set of flow channels define a flow perimeter greater than said inner perimeter of said main filter element, and wherein said safety filter element includes an outer portion at said first axial end thereof adjacent said first axial end of said main filter element and outside of said hollow interior and axially aligned with the area between said flow perimeter and said inner perimeter, and wherein said second end cap is at said outer portion.

36. The invention according to claim 35 wherein said outer surface of said flange maintains the seal against said first end cap regardless of whether said second end cap is sealed against said inner surface of said flange, and wherein said inner surface of said flange maintains the seal against said second end cap regardless of whether said first end cap is sealed against said outer surface of said flange.

37. A filter comprising a housing extending axially along an axis, a pleated main filter element having a plurality of pleats in a closed loop having an outer perimeter defined by a plurality of outer pleat tips, and an inner perimeter defined by a plurality of inner pleat tips, said loop having a hollow interior extending along said axis, wherein fluid to be filtered flows through said main filter element from an upstream dirty side to a downstream clean side, said pleats forming wall segments extending in a serpentine manner between said inner and outer pleat tips, said wall segments extending axially between upstream and downstream ends, said wall segments defining axial flow channels therebetween, said upstream ends of said wall segments being alternately sealed to each other to define a set of exterior flow channels open at said upstream ends, and a set of interior flow channels interdigitated with said exterior flow channels and closed at said upstream ends, a safety filter element in said hollow interior, such that fluid flows substantially directly axially through said main filter element, through said open upstream ends of said exterior flow channels then through said wall segments then through said interior flow channels then across said inner perimeter then through said safety filter element.

38. The invention according to claim 37 wherein said exterior channels are open at said outer perimeter such that fluid additionally flows into said exterior channels through said outer perimeter.

39. A fluid filter comprising a housing extending along an axis, a closed loop main filter element having a hollow interior extending along said axis, wherein fluid to be filtered flows through said main filter element from an upstream dirty side to a downstream clean side, and flows axially in said hollow interior, said main filter element having first and second axial ends, said first axial end being open and providing an axial flow exit passage therethrough, a safety filter element in said hollow interior downstream of said main filter element and having first and second axial ends, said first axial end of said safety filter element being adjacent said first axial end of said main filter element, said first axial end of said safety filter element being open and providing an axial flow exit passage therethrough, a first end cap at said first axial end of said main filter element, a second end cap at said first axial end of said safety filter element, and wherein said housing has an axial end with a flange extending axially between said first and second end caps and sealed respectively theragainst.

40. The invention according to claim 39 wherein said flange has an outer surface sealed against said first end cap, and an inner surface sealed against said second end cap.

41. The invention according to claim 40 wherein said outer surface of said flange maintains the seal against said first end cap regardless of whether said second end cap is sealed against said inner surface of said flange, and wherein said inner surface of said flange maintains the seal against said second end cap regardless of whether said first end cap is sealed against said outer surface of said flange.

* * * * *

UNITED STATES PATENT AND TRADEMARK OFFICE
Certificate

Patent No. 6,416,561 B1                                                        Patented: July 9, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kent J. Kallsen, Oregon, WI; Tadeusz Jaroszczyk, Stoughton, WI; Stephen L. Fallon, Madison, WI; Z. Gerald Liu, Madison, WI; Jerald J. Moy, Stoughton, WI; Jeff S. Morgan, Stoughton, WI; Michael J. Connor, Stoughton, WI; Scott P. Heckel, Stoughton, WI; and Jon S. Wake, Verona, WI.

Signed and Sealed this Ninth Day of March 2004.

BLAINE R. COPENHEAVER, JR.
*Supervisory Patent Examiner*
Art Unit 1700

UNITED STATES PATENT AND TRADEMARK OFFICE
Certificate

Patent No. 6,416,561 B1　　　　　　　　　　　　　　　　　　　　　　　Patented: July 9, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kent J. Kallsen, Oregon, WI; Tadeusz Jaroszczyk, Stoughton, WI; Stephen L. Fallon, Madison, WI; Z. Gerald Liu, Madison, WI; Jerald J. Moy, Stoughton, WI; Jeffrey S. Morgan, Stoughton, WI; Michael J. Connor, Stoughton, WI; Scott P. Heckel, Stoughton, WI; Jon S. Wake, Verona, WI; and Gerald P. Eiling, Stoughton, WI.

Signed and Sealed this First Day of June 2004.

BLAINE R. COPENHEAVER, JR.
*Supervisory Patent Examiner*
Art Unit 1700